(12) United States Patent
Kaneda et al.

(10) Patent No.: US 10,290,873 B2
(45) Date of Patent: May 14, 2019

(54) BINDER COMPOSITION FOR SECONDARY BATTERY ELECTRODE, SLURRY COMPOSITION FOR SECONDARY BATTERY ELECTRODE, ELECTRODE FOR SECONDARY BATTERY, AND SECONDARY BATTERY

(71) Applicant: ZEON CORPORATION, Chiyoda-ku, Tokyo (JP)

(72) Inventors: Takuya Kaneda, Tokyo (JP); Kentaro Hayasaka, Tokyo (JP); Yusaku Matsuo, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 11 days.

(21) Appl. No.: 15/503,789

(22) PCT Filed: Aug. 26, 2015

(86) PCT No.: PCT/JP2015/004296
§ 371 (c)(1),
(2) Date: Feb. 14, 2017

(87) PCT Pub. No.: WO2016/035286
PCT Pub. Date: Mar. 10, 2016

(65) Prior Publication Data
US 2017/0256800 A1    Sep. 7, 2017

(30) Foreign Application Priority Data
Sep. 5, 2014 (JP) .................................. 2014-181328

(51) Int. Cl.
*H01M 4/62* (2006.01)
*H01M 10/0525* (2010.01)
(Continued)

(52) U.S. Cl.
CPC ............ *H01M 4/622* (2013.01); *B01J 13/14* (2013.01); *C08F 212/08* (2013.01);
(Continued)

(58) Field of Classification Search
None
See application file for complete search history.

(56) References Cited

U.S. PATENT DOCUMENTS

2014/0141314 A1 * 5/2014 Kaneda ............... H01M 2/1653
429/144
2015/0303463 A1    10/2015 Sasaki

FOREIGN PATENT DOCUMENTS

CN    103947020 A    7/2014
EP    2680349 A1    1/2014
(Continued)

OTHER PUBLICATIONS

Mar. 7, 2017, International Preliminary Report on Patentability issued in the International Patent Application No. PCT/JP2015/004296.
(Continued)

*Primary Examiner* — Daniel S Gatewood
(74) *Attorney, Agent, or Firm* — Kenja IP Law PC

(57) ABSTRACT

Provided is a binder composition for a secondary battery electrode that can cause a secondary battery to display excellent rate characteristics and cycle characteristics. The binder composition for a secondary battery electrode contains a first particulate polymer having a core-shell structure including a core portion and a shell portion that partially covers an outer surface of the core portion.

16 Claims, 1 Drawing Sheet

(51) Int. Cl.
*H01M 4/131* (2010.01)
*H01M 4/133* (2010.01)
*H01M 4/134* (2010.01)
*C08F 265/04* (2006.01)
*C08F 212/08* (2006.01)
*C08L 51/06* (2006.01)
*C08L 25/14* (2006.01)
*C08L 33/08* (2006.01)
*C08J 3/12* (2006.01)
*B01J 13/14* (2006.01)
*H01M 4/02* (2006.01)

(52) U.S. Cl.
CPC ............ *C08F 265/04* (2013.01); *C08J 3/126* (2013.01); *C08L 25/14* (2013.01); *C08L 33/08* (2013.01); *C08L 51/06* (2013.01); *H01M 4/131* (2013.01); *H01M 4/133* (2013.01); *H01M 4/134* (2013.01); *H01M 10/0525* (2013.01); *C08J 2333/08* (2013.01); *C08J 2425/14* (2013.01); *C08L 2203/20* (2013.01); *C08L 2207/53* (2013.01); *H01M 2004/021* (2013.01)

(56) References Cited

FOREIGN PATENT DOCUMENTS

| | | | |
|---|---|---|---|
| JP | 2005011822 A | 1/2005 | |
| JP | 2008251965 A | 10/2008 | |
| JP | 2010146871 A | 7/2010 | |
| JP | 2010182439 A | 8/2010 | |
| JP | 2012104406 A * | 5/2012 | |
| JP | 2012104406 A | 5/2012 | |
| JP | 2012204303 A | 10/2012 | |
| JP | 2013004241 A | 1/2013 | |
| JP | 2015028840 A * | 2/2015 | .......... H01M 2/1653 |
| WO | 2012115096 A1 | 8/2012 | |
| WO | 2013077212 A1 | 5/2013 | |
| WO | WO-2013077212 A1 * | 5/2013 | .............. H01M 4/13 |
| WO | WO-2013080946 A1 * | 6/2013 | .......... H01M 2/1653 |
| WO | 2013099990 A1 | 7/2013 | |
| WO | WO-2014073647 A1 * | 5/2014 | ............ H01M 4/133 |
| WO | 2015111663 A1 | 7/2015 | |

OTHER PUBLICATIONS

Nov. 2, 2015, International Search Report issued in the International Patent Application No. PCT/JP2015/004296.

* cited by examiner

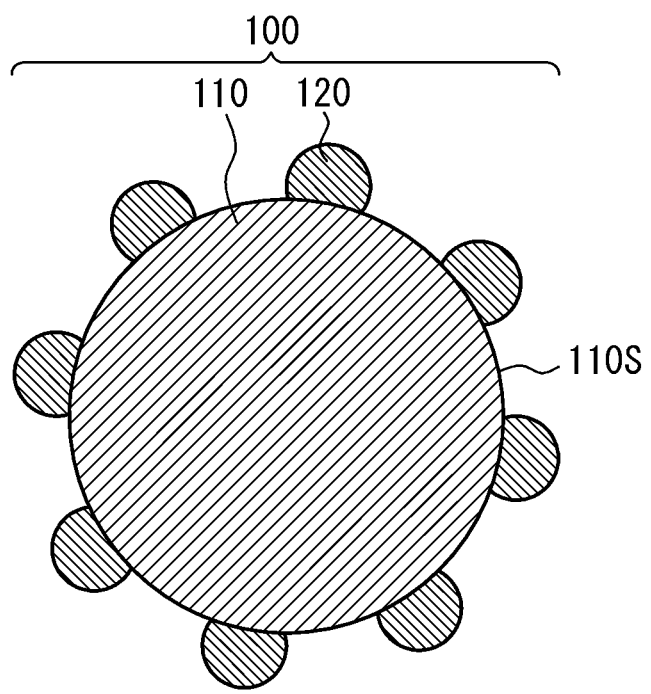

BINDER COMPOSITION FOR SECONDARY BATTERY ELECTRODE, SLURRY COMPOSITION FOR SECONDARY BATTERY ELECTRODE, ELECTRODE FOR SECONDARY BATTERY, AND SECONDARY BATTERY

TECHNICAL FIELD

The present disclosure relates to a binder composition for a secondary battery electrode, a slurry composition for a secondary battery electrode, an electrode for a secondary battery, and a secondary battery.

BACKGROUND

Secondary batteries such as lithium ion secondary batteries have characteristics such as compact size, light weight, high energy-density, and the ability to be repeatedly charged and discharged, and are used in a wide range of applications. Therefore, studies have been carried out in recent years with the objective of further raising the performance of secondary batteries through improvement of electrodes and other battery components.

An electrode for a secondary battery, such as a lithium ion secondary battery, normally includes a current collector and an electrode mixed material layer formed on the current collector. The electrode mixed material layer is formed, for example, by applying a slurry composition onto the current collector and then drying the applied slurry composition. The slurry composition contains a dispersion medium and, dispersed therein, an electrode active material, a binder composition containing a binder, and so forth.

In recent years, in order to further improve the performance of secondary batteries, much activity has been focused toward improving binder components in binder compositions used in electrode mixed material layer formation.

In one example, PTL 1 reports that excellent binding capacity is achieved by a copolymer latex that is obtained through emulsion polymerization of a monomer composition containing an aliphatic conjugated diene monomer, an alkyl (meth)acrylate monomer having an alkyl group with a carbon number of 1-3, an ethylenically unsaturated carboxylic acid monomer, and an aromatic vinyl monomer and/or a vinyl cyanide monomer in prescribed proportions, and that has a number average particle diameter and a degree of swelling in diethyl carbonate that are within prescribed ranges. PTL 1 proposes a technique for improving secondary battery high-rate discharge characteristics and charge/discharge cycle characteristics by forming an electrode using a binder composition containing the above-described copolymer latex.

In another example, PTL 2 proposes a technique for forming an electrode mixed material layer having increased homogeneity and excellent binding capacity with a current collector by using, as a binder for an electrode, a copolymer latex that is obtained through emulsion polymerization of a monomer composition containing an aliphatic conjugated diene monomer, an ethylenically unsaturated carboxylic acid monomer, and other monomers copolymerizable therewith in prescribed proportions and for which a filtration residue remaining on a 400-mesh sieve is no greater than 0.01 weight % relative to 100 weight % of solid content of the copolymer latex.

CITATION LIST

Patent Literature

PTL 1: JP 2010-146871 A
PTL 2: JP 2010-182439 A

SUMMARY

Technical Problem

However, with regards to a binder composition in which a conventional binder such as described above is used, there is room for improvement in terms of further enhancing electrical characteristics, such as rate characteristics and cycle characteristics, of a secondary battery formed using this binder composition.

Accordingly, one objective of the present disclosure is to provide a binder composition for a secondary battery electrode that can cause a secondary battery to display excellent rate characteristics and cycle characteristics.

Another objective of the present disclosure is to provide a slurry composition for a secondary battery electrode capable of forming an electrode mixed material layer that can cause a secondary battery to display excellent rate characteristics and cycle characteristics.

Another objective of the present disclosure is to provide an electrode for a secondary battery that can cause a secondary battery to display excellent rate characteristics and cycle characteristics.

Another objective of the present disclosure is to provide a secondary battery having excellent rate characteristics and cycle characteristics.

Solution to Problem

The inventors conducted diligent investigation with the aim of solving the problems described above. In their investigation, the inventors focused on the fact that sufficient conductivity of ions, such as lithium ions, is not ensured in an electrode mixed material layer formed using a binder composition according to conventional techniques such as described above, particularly in a situation in which the density of the electrode mixed material layer is increased, and, as a result, adequate electrical characteristics are not displayed. Through their investigation, the inventors discovered that when a particulate polymer having a core-shell structure including a core portion and shell portion that partially covers an outer surface of the core portion is used as a binder for an electrode, a secondary battery can be caused to display excellent rate characteristics and cycle characteristics while also ensuring strength of an electrode mixed material layer.

Specifically, the present disclosure aims to advantageously solve the problems described above by disclosing a binder composition for a secondary battery electrode comprising a first particulate polymer having a core-shell structure including a core portion and a shell portion that partially covers an outer surface of the core portion. Through use of a binder composition containing a particulate polymer having a core-shell structure in which a shell portion partially covers the outer surface of a core portion as described above, but does not completely cover the outer surface of the core portion, a secondary battery formed using the binder composition can be caused to display excellent rate characteristics and cycle characteristics.

In the presently disclosed binder composition for a secondary battery electrode, the core portion is preferably formed from a polymer having a degree of swelling in electrolysis solution of at least 300 mass % and no greater than 900 mass %, and the shell portion is preferably formed from a polymer having a degree of swelling in electrolysis solution of greater than 100 mass % and no greater than 200 mass %. As a result of the polymer forming the core portion of the first particulate polymer and the polymer forming the shell portion of the first particulate polymer having degrees of swelling in electrolysis solution that are within the aforementioned ranges, secondary battery rate characteristics and cycle characteristics can be further improved.

The "degree of swelling in electrolysis solution" of the polymer forming the core portion and the polymer forming the shell portion, referred to in the present disclosure, can be measured by a measurement method described in the EXAMPLES section of the present specification.

In the presently disclosed binder composition for a secondary battery electrode, the core portion is preferably formed from a polymer having a glass transition temperature of at least −60° C. and no higher than −15° C., and the shell portion is preferably formed from a polymer having a glass transition temperature of at least 40° C. and no higher than 200° C. As a result of the polymer forming the core portion of the first particulate polymer and the polymer forming the shell portion of the first particulate polymer having glass transition temperatures that are within the aforementioned ranges, an electrode having excellent peel strength between an electrode mixed material layer and a current collector can be obtained and secondary battery rate characteristics can be further improved.

The "glass transition temperature" of the polymer forming the core portion and the polymer forming the shell portion, referred to in the present disclosure, can be measured by a measurement method described in the EXAMPLES section of the present specification.

In the presently disclosed binder composition for a secondary battery electrode, a mass proportion of the shell portion in the first particulate polymer is preferably at least 3 mass % and no greater than 35 mass %. As a result of the proportion of the mass of the first particulate polymer that is constituted by the mass of the shell portion being within the aforementioned range, an electrode having excellent peel strength between an electrode mixed material layer and a current collector can be obtained and a balance of high levels of both secondary battery rate characteristics and secondary battery cycle characteristics can be achieved.

The "mass proportion of the shell portion" in the first particulate polymer, referred to in the present disclosure, can be calculated by a calculation method described in the EXAMPLES section of the present specification.

In the presently disclosed binder composition for a secondary battery electrode, the core portion is preferably formed from a polymer including at least 50 mass % and no greater than 99.5 mass % of a (meth)acrylic acid ester monomer unit. As a result of the polymer forming the core portion of the first particulate polymer including the (meth) acrylic acid ester monomer unit in the aforementioned proportion, secondary battery rate characteristics can be further improved.

In the present disclosure, "(meth)acryl" is used to indicate "acryl" and/or "methacryl".

The presently disclosed binder composition for a secondary battery electrode preferably further comprises a second particulate polymer, wherein the second particulate polymer has a degree of swelling in electrolysis solution of greater than 100 mass % and no greater than 200 mass % and a glass transition temperature of at least −10° C. and no higher than 40° C. As a result of the second particulate polymer having a degree of swelling in electrolysis solution and a glass transition temperature within the aforementioned ranges being used in combination with the first particulate polymer, an electrode having excellent peel strength between an electrode mixed material layer and a current collector can be obtained and secondary battery rate characteristics and cycle characteristics can be further improved.

The "degree of swelling in electrolysis solution" and the "glass transition temperature" of the second particulate polymer, referred to in the present disclosure, can be measured by measurement methods described in the EXAMPLES section of the present specification.

In the presently disclosed binder composition for a secondary battery electrode, it is preferable that, in terms of solid content, the first particulate polymer is contained in an amount of at least 30 parts by mass and no greater than 95 parts by mass per 100 parts by mass, in total, of the first particulate polymer and the second particulate polymer. As a result of the proportion constituted by the first particulate polymer being within the aforementioned range, a balance of high levels of both secondary battery rate characteristics and secondary battery cycle characteristics can be achieved.

In the presently disclosed binder composition for a secondary battery electrode, the second particulate polymer preferably includes at least 5 mass % and no greater than 70 mass % of a conjugated diene monomer unit and at least 10 mass % and no greater than 90 mass % of an aromatic vinyl monomer unit. As a result of the second particulate polymer including the conjugated diene monomer unit and the aromatic vinyl monomer unit in the aforementioned proportions, secondary battery cycle characteristics can be further improved.

In the presently disclosed binder composition for a secondary battery electrode, a number average particle diameter of the first particulate polymer is preferably equal to a number average particle diameter of the second particulate polymer multiplied by a factor of at least 1 and no greater than 5. As a result of the ratio of the number average particle diameters of the first particulate polymer and the second particulate polymer being within the aforementioned range, a balance of high levels of both secondary battery rate characteristics and secondary battery cycle characteristics can be achieved.

The "number average particle diameter" of a particulate polymer, referred to in the present disclosure, can be measured by a measurement method described in the EXAMPLES section of the present specification.

Moreover, the present disclosure aims to advantageously solve the problems described above by disclosing a slurry composition for a secondary battery electrode comprising: any one of the binder compositions for a secondary battery electrode described above; and an electrode active material. As a result of the binder composition that contains the first particulate polymer and the second particulate polymer being used in this manner, the resultant slurry composition for a secondary battery electrode is capable of forming an electrode mixed material layer that can cause a secondary battery to display excellent rate characteristics and cycle characteristics.

Furthermore, the present disclosure aims to advantageously solve the problems described above by disclosing an electrode for a secondary battery comprising an electrode mixed material layer obtained using the slurry composition for a secondary battery electrode described above. As a result of the electrode including an electrode mixed material layer formed using the slurry composition described above, the electrode can cause a secondary battery to display excellent rate characteristics and cycle characteristics.

In the presently disclosed electrode for a secondary battery, the electrode mixed material layer preferably has a porosity of at least 10.7% and no greater than 24.1%. As a result of the porosity of the electrode mixed material layer being within the aforementioned range, a secondary battery can be caused to display excellent rate characteristics and cycle characteristics while also achieving densification of the electrode mixed material layer.

In the present disclosure, "porosity" refers to the difference between the true density and the bulk density of an electrode mixed material layer, expressed as a percentage relative to the true density of the electrode mixed material layer. The porosity can, for example, be calculated using the following formula.

Porosity (%)=[1−{(Mass per unit area of electrode mixed material layer/Thickness of electrode mixed material layer)/True density of electrode mixed material layer}]×100

Moreover, the present disclosure aims to advantageously solve the problems described above by disclosing a secondary battery comprising a positive electrode, a negative electrode, a separator, and an electrolysis solution, wherein either or both of the positive electrode and the negative electrode are any one of the electrodes for a secondary battery described above. As a result of any of the electrodes described above being used as a positive electrode and/or a negative electrode in this manner, a secondary battery having excellent rate characteristics and cycle characteristics can be obtained.

Advantageous Effect

According to the present disclosure, it is possible to provide a binder composition for a secondary battery electrode that can cause a secondary battery to display excellent rate characteristics and cycle characteristics. Moreover, according to the present disclosure, it is possible to provide a slurry composition for a secondary battery electrode capable of forming an electrode mixed material layer that can cause a secondary battery to display excellent rate characteristics and cycle characteristics.

Furthermore, according to the present disclosure, it is possible to provide an electrode for a secondary battery that can cause a secondary battery to display excellent rate characteristics and cycle characteristics.

Also, according to the present disclosure, it is possible to provide a secondary battery having excellent rate characteristics and cycle characteristics.

BRIEF DESCRIPTION OF THE DRAWING

In the accompanying drawing,

FIG. 1 is a cross-sectional view schematically illustrating an example of structure of a first particulate polymer contained in a presently disclosed binder composition for a secondary battery electrode.

DETAILED DESCRIPTION

The following provides a detailed description of a presently disclosed embodiment.

Herein, a presently disclosed binder composition for a secondary battery electrode can be used in production of a slurry composition for a secondary battery electrode. Moreover, a slurry composition for a secondary battery electrode produced using the presently disclosed binder composition for a secondary battery electrode can be used in formation of an electrode for a secondary battery. Furthermore, a presently disclosed secondary battery includes the presently disclosed electrode for a secondary battery.

(Binder Composition for Secondary Battery Electrode)

The presently disclosed binder composition for a secondary battery electrode is an aqueous binder composition that has an aqueous medium as a dispersion medium and that contains a particulate binder and water, and may optionally further contain other components that are normally used in the field of secondary batteries. A feature of the presently disclosed binder composition for a secondary battery electrode is that a particulate polymer (first particulate polymer) having a core-shell structure including a core portion and a shell portion that partially covers an outer surface of the core portion is used as the particulate binder.

<Binder>

In an electrode for a secondary battery that is produced by forming an electrode mixed material layer on a current collector using a slurry composition for a secondary battery electrode containing the presently disclosed binder composition and an electrode active material, the binder is a component that holds together components contained in the electrode mixed material layer so that these components do not become detached from the electrode mixed material layer. In general, when a particulate binder in an electrode mixed material layer is immersed in an electrolysis solution, the binder absorbs the electrolysis solution and swells while maintaining its particulate form, and thereby causes binding of an electrode active material to itself or between the electrode active material and a current collector such as to prevent the electrode active material from becoming detached from the current collector. The binder also fulfills a function of binding particles other than the electrode active material that are contained in the electrode mixed material layer in order to maintain strength of the electrode mixed material layer.

A feature of the presently disclosed binder composition is that the first particulate polymer having the specific core-shell structure described above is used as the particulate binder in order that an electrode including an electrode mixed material layer formed using the binder composition can cause a secondary battery to display excellent rate characteristics and cycle characteristics. However, it should be noted that the presently disclosed binder composition may further contain a particulate polymer other than the first particulate polymer as the particulate binder. For example, the presently disclosed binder composition may further contain a second particulate polymer described further below.

[First Particulate Polymer]

As explained above, the first particulate polymer has a core-shell structure including a core portion and a shell portion that covers an outer surface of the core portion. Note that the shell portion partially covers the outer surface of the core portion. In other words, the shell portion of the first particulate polymer covers the outer surface of the core portion but does not completely cover the outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion. Accordingly, a particulate polymer that, for example, includes a shell portion having fine pores that pass from the outer surface of the shell portion (i.e., a circumferential surface of the particulate polymer) to the outer surface of the core portion is also considered to be within the scope of the first particulate polymer described above.

Although the reason that secondary battery electrical characteristics can be improved by using the first particulate polymer having a core-shell structure such as described above has not yet been clarified, the reason is presumed to be as follows.

Specifically, as a result of the first particulate polymer having a structure in which the shell portion partially covers the outer surface of the core portion, in an electrode mixed material layer obtained therewith, the first particulate polymer adheres to an electrode active material, a current collector, and the like through the shell portion and through the outer surface of the core portion at locations where the outer surface of the core portion is not covered, and thereby maintains the strength of the electrode mixed material layer. On the other hand, spaces that originate from locations that are not covered by the shell portion at the surface of the particulate polymer and that enable ion conductivity are ensured in the aforementioned electrode mixed material layer. Therefore, it is presumed that the first particulate polymer can cause a secondary battery to display excellent rate characteristics and cycle characteristics because the first particulate polymer binds an electrode active material in an electrode mixed material layer while also ensuring ion conductivity in the electrode mixed material layer.

Herein, the shell portion of the first particulate polymer is preferably composed by a plurality of shell portion structures.

Specifically, as illustrated in an example of a cross-sectional structure of the first particulate polymer in FIG. 1, the first particulate polymer 100 preferably has a core-shell structure including a core portion 110 and a shell portion composed by a plurality of shell portion structures 120. The core portion 110 is a portion of the first particulate polymer 100 that is located further inward than the shell portion structures 120. The shell portion structures 120 cover an outer surface 110S of the core portion 110 and the shell portion composed by these shell portion structures 120 is normally an outermost portion of the first particulate polymer 100. The shell portion composed by the plurality of shell portion structures 120 partially covers the outer surface 110S of the core portion 110, but does not completely cover the outer surface 110S of the core portion 110.

The first particulate polymer may include optional elements other than the core portion and the shell portion described above so long as the desired effects are not significantly lost as a result. Specifically, the first particulate polymer may, for example, include a portion inside of the core portion that is formed from a different polymer to the core portion. In one specific example, residual seed particles may be present inside of the core portion in a situation in which seed particles are used in production of the particulate polymer by seed polymerization. However, from a viewpoint of more noticeably displaying the desired effects, it is preferable that the first particulate polymer is composed by only the core portion and the shell portion.

[[Core Portion]]
—Properties of Core Portion—
The degree of swelling in electrolysis solution of a polymer forming the core portion (hereinafter, also referred to simply as the "polymer of the core portion") is preferably at least 300 mass %, more preferably at least 400 mass %, and even more preferably at least 500 mass %, and is preferably no greater than 900 mass %, more preferably no greater than 800 mass %, and even more preferably no greater than 700 mass %. As a result of the degree of swelling in electrolysis solution of the polymer of the core portion being at least 300 mass %, ion conductivity can be ensured and secondary battery electrical characteristics, such as rate characteristics, can be improved. On the other hand, as a result of the degree of swelling in electrolysis solution of the polymer of the core portion being no greater than 900 mass %, an electrode active material can be sufficiently bound and secondary battery cycle characteristics can be improved.

The glass transition temperature of the polymer forming the core portion is preferably at least −60° C., more preferably at least −55° C., even more preferably at least −50° C., and particularly preferably at least −40° C., and is preferably no higher than −15° C., more preferably no higher than −25° C., and even more preferably no higher than −30° C. As a result of the glass transition temperature of the polymer of the core portion being at least −60° C., binding capacity of the first particulate polymer can be increased and peel strength of an electrode including an electrode mixed material layer that is formed using the binder composition can be improved. Moreover, as a result of the glass transition temperature of the polymer of the core portion being no higher than −15° C., deformation of an electrode active material due to a pressing process in formation of an electrode mixed material layer can be inhibited and, as a result, secondary battery rate characteristics can be improved.

The degree of swelling in electrolysis solution and the glass transition temperature of the polymer of the core portion can be adjusted without any specific limitations by altering, for example, the type and amount of each monomer used to form the polymer of the core portion, and the molecular weight and crosslink density of the polymer of the core portion.

—Core Portion Composition—
A freely selected polymer can be used as the polymer of the core portion in the first particulate polymer. The polymer of the core portion may be, for example, a copolymer (A) including a (meth)acrylic acid ester monomer unit. The following describes the copolymer (A) including the (meth) acrylic acid ester monomer unit as one example of the polymer of the core portion in the first particulate polymer.

The phrase "including a monomer unit" is used in the present specification with the meaning that "a polymer obtained with the monomer includes a structural unit (repeating unit) derived from the monomer".

Examples of (meth)acrylic acid ester monomers that can be used to form the (meth)acrylic acid ester monomer unit of the copolymer (A) include, but are not specifically limited to, alkyl acrylates such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl methacrylates such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these (meth)acrylic acid ester monomers, alkyl acrylates are preferable, ethyl acrylate, n-butyl acrylate, and 2-ethylhexyl acrylate are more preferable, and n-butyl acrylate is even more preferable.

One of such (meth)acrylic acid ester monomers may be used individually, or two or more of such (meth)acrylic acid ester monomers may be used in combination in a freely selected ratio.

The proportion constituted by the (meth)acrylic acid ester monomer unit in the copolymer (A) is preferably at least 20 mass %, more preferably at least 50 mass %, even more preferably at least 70 mass %, and particularly preferably at least 90 mass %, and is preferably no greater than 99.5 mass %, more preferably no greater than 99 mass %, and even more preferably no greater than 98 mass %. As a result of the proportion constituted by the (meth)acrylic acid ester monomer unit in the polymer of the core portion being within any of the aforementioned ranges, a secondary battery can be caused to display excellent rate characteristics.

In addition to the (meth)acrylic acid ester monomer unit described above, the copolymer (A) may optionally include an ethylenically unsaturated carboxylic acid monomer unit, a vinyl cyanide monomer unit, a conjugated diene monomer unit, and other monomer units.

Examples of ethylenically unsaturated carboxylic acid monomers that can be used to form the ethylenically unsaturated carboxylic acid monomer unit of the copolymer (A) include, but are not specifically limited to, monocarboxylic acids and dicarboxylic acids such as acrylic acid, methacrylic acid, crotonic acid, maleic acid, fumaric acid, and itaconic acid, and anhydrides of these carboxylic acids. Of these ethylenically unsaturated carboxylic acid monomers, ethylenically unsaturated monocarboxylic acid monomers are preferable, acrylic acid and methacrylic acid are more preferable, and methacrylic acid is even more preferable.

One ethylenically unsaturated carboxylic acid monomer may be used individually, or two or more ethylenically unsaturated carboxylic acid monomers may be used in combination in a freely selected ratio.

The proportion constituted by the ethylenically unsaturated carboxylic acid monomer unit in the copolymer (A) is preferably at least 0.1 mass %, more preferably at least 0.2 mass %, and even more preferably at least 0.3 mass %, and is preferably no greater than 10 mass %, more preferably no greater than 8 mass %, and even more preferably no greater than 5 mass %.

Examples of vinyl cyanide monomers that can be used to form the vinyl cyanide monomer unit of the copolymer (A) include, but are not specifically limited to, acrylonitrile, methacrylonitrile, α-chloroacrylonitrile, and α-ethylacrylonitrile. Of these vinyl cyanide monomers, acrylonitrile is preferable.

One vinyl cyanide monomer may be used individually, or two or more vinyl cyanide monomers may be used in combination in a freely selected ratio.

The proportion constituted by the vinyl cyanide monomer unit in the copolymer (A) is preferably at least 0.1 mass %, and more preferably at least 0.2 mass %, and is preferably no greater than 10 mass %, and more preferably no greater than 5 mass %.

Examples of conjugated diene monomers that can be used to form the conjugated diene monomer unit of the copolymer (A) include, but are not specifically limited to, aliphatic conjugated diene monomers such as 1,3-butadiene, 2-methyl-1,3-butadiene, 2,3-dimethyl-1,3-butadiene, 2-chloro-1,3-butadiene, substituted linear conjugated pentadienes, and substituted and side-chain conjugated hexadienes. Of these conjugated diene monomers, 1,3-butadiene is preferable.

One conjugated diene monomer may be used individually, or two or more conjugated diene monomers may be used in combination in a freely selected ratio.

It is preferable that the copolymer (A) includes the conjugated diene monomer unit in a situation in which the proportion constituted by the (meth)acrylic acid ester monomer unit in the copolymer (A) is small (for example, at least 15 mass % and no greater than 25 mass %). In such a situation, the proportion constituted by the conjugated diene monomer unit in the copolymer (A) is preferably at least 5 mass %, more preferably at least 15 mass %, and even more preferably at least 20 mass %, and is preferably no greater than 70 mass %, more preferably no greater than 55 mass %, and even more preferably no greater than 50 mass %.

Examples of other monomer units include monomer units obtained through polymerization of the optional monomers listed below. One of such optional monomers may be used individually, or two or more of such optional monomers may be used in combination in a freely selected ratio.

Examples of optional monomers that can be used include crosslinkable monomers such as allyl methacrylate and N-methylolacrylamide; styrene-based monomers such as styrene, chlorostyrene, vinyltoluene, t-butylstyrene, methyl vinylbenzoate, vinylnaphthalene, chloromethylstyrene, hydroxymethylstyrene, and α-methylstyrene; unsaturated carboxylic acid amide monomers such as acrylamide and methacrylamide; sulfonate group-containing monomers such as vinyl sulfonic acid, styrene sulfonic acid, allyl sulfonic acid, sulfoethyl methacrylate, sulfopropyl methacrylate, and sulfobutyl methacrylate, and alkali metal salts thereof; and fluorine-containing (meth)acrylic acid ester monomers.

The proportion constituted by such other monomer units in the copolymer (A) is preferably from 0 mass % to 30 mass %, and more preferably from 0 mass % to 25 mass %.

The polymer of the core portion constituted by the copolymer (A) described above can be produced, for example, through polymerization, in an aqueous solvent, of a core portion monomer composition containing the aforementioned monomers as described further below. The proportion constituted by each monomer in the core portion monomer composition is normally the same as the proportion constituted by the corresponding repeating unit (monomer unit) in the target polymer of the core portion.

[[Shell Portion]]
—Properties of Shell Portion—

The degree of swelling in electrolysis solution of a polymer forming the shell portion (hereinafter, also referred to simply as the "polymer of the shell portion") is preferably greater than 100 mass %, more preferably at least 105 mass %, and even more preferably at least 110 mass %, and is preferably no greater than 200 mass %, more preferably no greater than 170 mass %, and even more preferably no greater than 140 mass %. As a result of the degree of swelling in electrolysis solution of the polymer of the shell portion being greater than 100 mass %, ion conductivity can be ensured and secondary battery electrical characteristics, such as rate characteristics, can be improved. On the other hand, as a result of the degree of swelling in electrolysis solution of the polymer of the shell portion being no greater than 200 mass %, an electrode active material can be sufficiently bound and secondary battery cycle characteristics can be improved.

The glass transition temperature of the polymer forming the shell portion is preferably at least 40° C., more preferably at least 60° C., and even more preferably at least 80° C., and is preferably no higher than 200° C., more preferably no higher than 160° C., and even more preferably no higher than 140° C. As a result of the glass transition temperature of the polymer of the shell portion being within any of the aforementioned ranges, binding capacity of the first particulate polymer can be increased and peel strength of an electrode including an electrode mixed material layer that is formed using the binder composition can be improved.

—Shell Portion Composition—

A freely selected polymer can be used as the polymer of the shell portion in the first particulate polymer. The polymer of the shell portion may be, for example, a copolymer (B) including an aromatic vinyl monomer unit and an ethylenically unsaturated carboxylic acid monomer unit. The following describes the copolymer (B) including the aromatic vinyl monomer unit and the ethylenically unsaturated carboxylic acid monomer unit as one example of the polymer of the shell portion in the first particulate polymer.

Examples of aromatic vinyl monomers that can be used to form the aromatic vinyl monomer unit of the copolymer (B) include, but are not specifically limited to, styrene, α-methylstyrene, vinyltoluene, and divinyl benzene. Of these aromatic vinyl monomers, styrene is preferable.

One aromatic vinyl monomer may be used individually, or two or more aromatic vinyl monomers may be used in combination in a freely selected ratio.

The proportion constituted by the aromatic vinyl monomer unit in the copolymer (B) is preferably at least 50 mass %, more preferably at least 70 mass %, and even more preferably at least 80 mass %, and is preferably no greater than 99 mass %, more preferably no greater than 98 mass %, and even more preferably no greater than 97 mass %.

Examples of ethylenically unsaturated carboxylic acid monomers that can be used to form the ethylenically unsaturated carboxylic acid monomer unit of the copolymer (B) include, but are not specifically limited to, the same ethylenically unsaturated carboxylic acid monomers as described in the "Core portion composition" section. Of these ethylenically unsaturated carboxylic acid monomers, acrylic acid and methacrylic acid are more preferable, and methacrylic acid is even more preferable.

The proportion constituted by the ethylenically unsaturated carboxylic acid monomer unit in the copolymer (B) is preferably at least 0.1 mass %, more preferably at least 1 mass %, and even more preferably at least 3 mass %, and is preferably no greater than 15 mass %, more preferably no greater than 10 mass %, and even more preferably no greater than 8 mass %.

The copolymer (B) may include other monomer units in addition to the aromatic vinyl monomer unit and the ethylenically unsaturated carboxylic acid monomer unit described above.

Examples of other monomer units that can be included in the copolymer (B) include all monomer units described in the "Core portion composition" section, exclusive of those that are aromatic vinyl monomer units and ethylenically unsaturated carboxylic acid monomer units.

The proportion constituted by monomer units other than the aromatic vinyl monomer unit and the ethylenically unsaturated carboxylic acid monomer unit in the copolymer (B) is preferably from 0 mass % to 30 mass %, and more preferably from 0 mass % to 25 mass %.

The polymer of the shell portion constituted by the copolymer (B) described above can be produced, for example, through polymerization, in an aqueous solvent, of a shell portion monomer composition containing the aforementioned monomers after formation of the core portion as described further below. The proportion constituted by each monomer in the shell portion monomer composition is normally the same as the proportion constituted by the corresponding repeating unit (monomer unit) in the target polymer of the shell portion.

[[Properties of First Particulate Polymer]]

—Mass Proportion of Shell Portion—

The mass proportion of the shell portion in the first particulate polymer is preferably at least 3 mass %, more preferably at least 5 mass %, and even more preferably at least 10 mass %, and is preferably no greater than 35 mass %, more preferably no greater than 30 mass %, and even more preferably no greater than 25 mass %. As a result of the proportion of the mass of the first particulate polymer that is composed by the mass of the shell portion being at least 3 mass %, secondary battery cycle characteristics can be improved. On the other hand, as a result of the proportion of the mass of the first particulate polymer that is composed by the mass of the shell portion being no greater than 35 mass %, ion conductivity can be ensured in an electrode mixed material layer obtained using the binder composition and electrical characteristics, such as rate characteristics, can be improved. Furthermore, peel strength between the electrode mixed material layer and a current collector can be improved.

—Number Average Particle Diameter—

The number average particle diameter of the first particulate polymer is preferably at least 100 nm, more preferably at least 150 nm, even more preferably at least 200 nm, and particularly preferably at least 300 nm, and is preferably no greater than 1,000 nm, more preferably no greater than 800 nm, even more preferably no greater than 600 nm, and particularly preferably no greater than 400 nm. As a result of the number average particle diameter of the first particulate polymer being within any of the aforementioned ranges, suppression of expansion and contraction of an electrode active material and reduction of resistance of an electrode mixed material layer can be favorably achieved.

The number average particle diameter of the first particulate polymer can be appropriately adjusted by, for example, adjusting the amount of an emulsifier and the amount of each monomer.

[[Production Method of First Particulate Polymer]]

The first particulate polymer having the core-shell structure described above can be produced, for example, by stepwise polymerization in which one or more monomers for the polymer of the core portion and one or more monomers for the polymer of the shell portion are used and the ratio of these monomers is changed over time. Specifically, the first particulate polymer can be produced by continuous, multi-step emulsion polymerization or multi-step suspension polymerization in which a polymer formed in a preceding step is then covered by a polymer formed in a succeeding step.

The following describes one example of a case in which the first particulate polymer having the core-shell structure described above is obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide or an azo compound such as 2,2'-azobis(2-methyl-N-(2-hydroxyethyl)propionamide) or 2,2'-azobis(2-amidinopropane) hydrochloride may, for example, be used as a polymerization initiator.

The polymerization may for example be carried out by a method including a step in which the core portion monomer composition is polymerized to form the polymer of the core portion (core portion formation step) and a step in which the shell portion monomer composition is added into the polymerization system containing the polymer of the core portion and in which the shell portion monomer composition is polymerized to form the polymer of the shell portion partially covering the outer surface of the core portion (shell portion formation step).

Specifically, the polymerization procedure involves initially, in the core portion formation step, adding the polymerization initiator to the core portion monomer composition, which is obtained by mixing one or more monomers for forming the core portion and the emulsifier in a polymerization medium such as water, and then performing emulsion polymerization at once to obtain the polymer forming the core portion in the form of particles. Furthermore, the first particulate polymer having the core-shell structure described above can then be obtained in the shell portion formation step by performing polymerization of the shell portion monomer composition, which contains one or more monomers for forming the shell portion, in the presence of the polymer forming the core portion, which is in the form of particles.

In this polymerization, it is preferable that the shell portion monomer composition is supplied into the polymerization system either continuously or divided into a plurality of portions. When the shell portion monomer composition is supplied, it is preferable that the shell portion monomer composition is added into the polymerization system over a short period of time from a viewpoint of partially covering the outer surface of the core portion with the shell portion. The time between initiation of addition of the shell portion monomer composition and completion of addition of the shell portion monomer composition (i.e., the addition time) varies depending on the scale of production and so forth, but is preferably no longer than 1 hour, more preferably no longer than 40 minutes, even more preferably no longer than 20 minutes, further preferably no longer than 10 minutes, particularly preferably no longer than 5 minutes, and most preferably no longer than 3 minutes (substantially equivalent to a single addition).

Through the procedure described above, the polymer forming the shell portion can be formed as shell portion structures that are in the form of particles and these shell portion structures can bond to the core portion such as to form the shell portion partially covering the core portion.

Furthermore, it tends to be easier to form the shell portion partially covering the core portion by using a monomer having a low affinity with respect to the polymerization solvent as a monomer for forming the polymer of the shell portion. Accordingly, in a situation in which the polymerization solvent is water, one or more monomers used for forming the polymer of the shell portion preferably include a hydrophobic monomer, and particularly preferably include an aromatic vinyl monomer.

Moreover, reducing the amount of the emulsifier that is used in polymerization of the shell portion and raising the temperature during polymerization of the shell portion also tend to facilitate formation of the shell portion partially covering the core portion. Accordingly, the shell portion partially covering the core portion can also be formed by appropriately adjusting the amount of the emulsifier and the polymerization temperature.

[Second Particulate Polymer]

In addition to the first particulate polymer described above, the presently disclosed binder composition preferably contains a second particulate polymer having a degree of swelling in electrolysis solution of greater than 100 mass % and no greater than 200 mass % and a glass transition temperature of at least −10° C. and no higher than 40° C. When the presently disclosed binder composition is used to form an electrode mixed material layer, the main functions of the second particulate polymer are to display good binding capacity and to sufficiently restrain expansion and contraction of an electrode active material such as to suppress electrode expansion.

Note that in the present disclosure, a polymer that is included in the first particulate polymer is not considered to be included in the second particulate polymer.

—Degree of Swelling in Electrolysis Solution—

The degree of swelling in electrolysis solution of the second particulate polymer is required to be greater than 100 mass % and no greater than 200 mass %, is preferably at least 120 mass % and more preferably at least 140 mass %, and is preferably no greater than 180 mass % and more preferably no greater than 160 mass %. As a result of the degree of swelling in electrolysis solution of the second particulate polymer being greater than 100 mass %, lowering of ion conductivity and lowering of secondary battery electrical characteristics, such as rate characteristics, can be inhibited. Moreover, as a result of the degree of swelling in electrolysis solution of the second particulate polymer being no greater than 200 mass %, an electrode active material can be sufficiently bound and, as a result, secondary battery cycle characteristics are improved.

—Glass Transition Temperature—

The glass transition temperature of the second particulate polymer is required to be at least −10° C. and no higher than 40° C., is preferably at least −5° C., and more preferably at least 0° C., and is preferably no higher than 30° C., more preferably no higher than 20° C., and even more preferably no higher than 15° C. As a result of the glass transition temperature of the second particulate polymer being within any of the aforementioned ranges, binding capacity can be sufficiently improved and, as a result, peel strength of an electrode including an electrode mixed material layer formed using the binder composition is improved. Moreover, as a result of the glass transition temperature of the second particulate polymer being no higher than 40° C., deformation of an electrode active material during a pressing process can be inhibited and, as a result, secondary battery rate characteristics are improved.

The degree of swelling in electrolysis solution and the glass transition temperature of the second particulate polymer can be adjusted without any specific limitations by altering, for example, the type and amount of each monomer used to form the second particulate polymer, and the molecular weight and crosslink density of the second particulate polymer.

—Number Average Particle Diameter—

The number average particle diameter of the second particulate polymer is preferably at least 100 nm, and more preferably at least 120 nm, and is preferably no greater than 200 nm, and more preferably no greater than 170 nm. As a result of the number average particle diameter being within any of the aforementioned ranges, suppression of expansion and contraction of an electrode active material and reduction of resistance of an electrode mixed material layer can be favorably achieved.

With regards to the number average particle diameters of the first particulate polymer and the second particulate polymer described above, it is preferable that the number average particle diameter of the first particulate polymer is equal to the number average particle diameter of the second particulate polymer multiplied by a factor of at least 1, more preferably by a factor of at least 1.5, and even more preferably by a factor of at least 2, and preferably by a factor of no greater than 5, more preferably by a factor of no greater than 4, and even more preferably by a factor of no greater than 3. As a result of a particle diameter ratio of the number average particle diameters of the first particulate polymer and the second particulate polymer (first particulate polymer/second particulate polymer) being within any of the aforementioned ranges, the first particulate polymer and the second particulate polymer can both favorably display the functions expected thereof and a balance of high levels of both secondary battery rate characteristics and secondary battery cycle characteristics can be achieved.

—Polymer Composition—

A polymer constituting the second particulate polymer can be any polymer that has the properties described above and that is present in the form of particles in an aqueous medium used as a dispersion medium. Specifically, the polymer constituting the second particulate polymer may for example be, but is not specifically limited to, a copolymer (C) including a conjugated diene monomer unit and an aromatic vinyl monomer unit. The following describes the copolymer (C) including the conjugated diene monomer unit and the aromatic vinyl monomer unit as one example of a polymer that may constitute the second particulate polymer.

Examples of conjugated diene monomers that can be used to form the conjugated diene monomer unit of the copolymer (C) include, but are not specifically limited to, the same conjugated diene monomers as described in the "First particulate polymer" section. Of these conjugated diene monomers, 1,3-butadiene is preferable.

One conjugated diene monomer may be used individually, or two or more conjugated diene monomers may be used in combination in a freely selected ratio.

The proportion constituted by the conjugated diene monomer unit in the copolymer (C) is preferably at least 5 mass %, more preferably at least 15 mass %, and even more preferably at least 20 mass %, and is preferably no greater than 70 mass %, more preferably no greater than 55 mass %, and even more preferably no greater than 40 mass %. As a result of the proportion constituted by the conjugated diene monomer unit in the second particulate polymer being within any of the aforementioned ranges, a secondary battery can be caused to display excellent cycle characteristics.

Examples of aromatic vinyl monomers that can be used to form the aromatic vinyl monomer unit of the copolymer (C) include, but are not specifically limited to, the same aromatic vinyl monomers as described in the "First particulate polymer" section. Of these aromatic vinyl monomers, styrene is preferable.

One aromatic vinyl monomer may be used individually, or two or more aromatic vinyl monomers may be used in combination in a freely selected ratio.

The proportion constituted by the aromatic vinyl monomer unit in the copolymer (C) is preferably at least 10 mass %, more preferably at least 30 mass %, and even more preferably at least 50 mass %, and is preferably no greater than 90 mass %, more preferably no greater than 80 mass %, and even more preferably no greater than 70 mass %. As a result of the proportion constituted by the aromatic vinyl monomer unit in the second particulate polymer being within any of the aforementioned ranges, a secondary battery can be caused to display excellent cycle characteristics.

The copolymer (C) may include other monomer units in addition to the conjugated diene monomer unit and the aromatic vinyl monomer unit described above.

Specifically, in addition to the conjugated diene monomer unit and the aromatic vinyl monomer unit, the copolymer (C) may include an ethylenically unsaturated carboxylic acid monomer unit, a vinyl cyanide monomer unit, a (meth)acrylic acid ester monomer unit, a hydroxyalkyl group-containing unsaturated monomer unit, and an unsaturated carboxylic acid amide monomer unit.

Examples of ethylenically unsaturated carboxylic acid monomers that can be used to form the ethylenically unsaturated carboxylic acid monomer unit of the copolymer (C) include, but are not specifically limited to, the same ethylenically unsaturated carboxylic acid monomers as described in the "First particulate polymer" section. Of these ethylenically unsaturated carboxylic acid monomers, acrylic acid, methacrylic acid, and itaconic acid are preferable.

One ethylenically unsaturated carboxylic acid monomer may be used individually, or two or more ethylenically unsaturated carboxylic acid monomers may be used in combination in a freely selected ratio.

The proportion constituted by the ethylenically unsaturated carboxylic acid monomer unit in the copolymer (C) is preferably at least 0.1 mass %, more preferably at least 0.2 mass %, and even more preferably at least 0.3 mass %, and is preferably no greater than 10 mass %, more preferably no greater than 8 mass %, and even more preferably no greater than 5 mass %.

Examples of vinyl cyanide monomers that can be used to form the vinyl cyanide monomer unit of the copolymer (C) include, but are not specifically limited to, the same vinyl cyanide monomers as described in the "First particulate polymer" section. Of these vinyl cyanide monomers, acrylonitrile and methacrylonitrile are preferable.

One vinyl cyanide monomer may be used individually, or two or more vinyl cyanide monomers may be used in combination in a freely selected ratio.

The proportion constituted by the vinyl cyanide monomer unit in the copolymer (C) is preferably at least 0.1 mass %, and more preferably at least 1 mass %, and is preferably no greater than 10 mass %, and more preferably no greater than 8 mass %.

Examples of (meth)acrylic acid ester monomers that can be used to form the (meth)acrylic acid ester monomer unit of the copolymer (C) include, but are not specifically limited to, the same (meth)acrylic acid ester monomers as described in the "First particulate polymer" section.

One (meth)acrylic acid ester monomer may be used individually, or two or more (meth)acrylic acid ester monomers may be used in combination in a freely selected ratio.

The proportion constituted by the (meth)acrylic acid ester monomer unit in the copolymer (C) is preferably no greater than 10 mass %, more preferably no greater than 8 mass %, and even more preferably no greater than 5 mass %.

Examples of hydroxyalkyl group-containing unsaturated monomers that can be used to form the hydroxyalkyl group-containing unsaturated monomer unit of the copolymer (C) include β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di(ethylene glycol)

maleate, di(ethylene glycol) itaconate, 2-hydroxyethyl maleate, bis(2-hydroxyethyl) maleate, and 2-hydroxyethyl methyl maleate. Of these hydroxyalkyl group-containing unsaturated monomers, β-hydroxyethyl acrylate is preferable.

One hydroxyalkyl group-containing unsaturated monomer may be used individually, or two or more hydroxyalkyl group-containing unsaturated monomers may be used in combination in a freely selected ratio.

The proportion constituted by the hydroxyalkyl group-containing unsaturated monomer unit in the copolymer (C) is preferably at least 0.1 mass %, more preferably at least 0.2 mass %, and even more preferably at least 0.3 mass %, and is preferably no greater than 10 mass %, more preferably no greater than 5 mass %, and even more preferably no greater than 3 mass %.

Examples of unsaturated carboxylic acid amide monomers that can be used to form the unsaturated carboxylic acid amide monomer unit of the copolymer (C) include acrylamide, methacrylamide, N-methylolacrylamide, N-methylolmethacrylamide, and N,N-dimethylacrylamide. Of these unsaturated carboxylic acid amide monomers, acrylamide and methacrylamide are preferable.

One unsaturated carboxylic acid amide monomer may be used individually, or two or more unsaturated carboxylic acid amide monomers may be used in combination in a freely selected ratio.

The proportion constituted by the unsaturated carboxylic acid amide monomer unit in the copolymer (C) is preferably no greater than 10 mass %, more preferably no greater than 8 mass %, and even more preferably no greater than 5 mass %.

The second particulate polymer constituted by the copolymer (C) described above can be produced, for example, through polymerization, in an aqueous solvent, of a second particulate polymer monomer composition containing the monomers described above. The proportion constituted by each monomer in the second particulate polymer monomer composition is normally the same as the proportion constituted by the corresponding repeating unit (monomer unit) in the target second particulate polymer.

No specific limitations are placed on the mode of polymerization and a method such as solution polymerization, suspension polymerization, bulk polymerization, or emulsion polymerization can be used. Examples of types of polymerization reactions that can be used include ionic polymerization, radical polymerization, and living radical polymerization. Emulsion polymerization is particularly preferable from the perspective of production efficiency because a high molecular weight is easily achieved, and because re-dispersion treatment is unnecessary since the resultant polymer is already dispersed in water, which allows the polymer to be used, as produced, in the production of the binder composition. The emulsion polymerization can be carried out by a standard method.

The polymerization may be carried out with a commonly used emulsifier, dispersant, polymerization initiator, polymerization aid, chain transfer agent, or the like, and the amount thereof may also be the same as commonly used. In the polymerization, seed particles may be used to perform seed polymerization. The polymerization conditions may also be selected freely in accordance with the polymerization method, type of polymerization initiator, and the like.

The pH of an aqueous dispersion of polymer particles that is obtained through the polymerization method described above may be adjusted to within a range of normally 5-10, and preferably 5-9, using a basic aqueous solution containing a hydroxide of an alkali metal (for example, Li, Na, K, Rb, or Cs), ammonia, an inorganic ammonium compound (for example, $NH_4Cl$), an organic amine compound (for example, ethanolamine or diethylamine), or the like.

[Content of Particulate Polymers]

In the presently disclosed binder composition, the content of the first particulate polymer in terms of solid content per 100 parts by mass, in total, of the first particulate polymer and the second particulate polymer is preferably at least 30 parts by mass, more preferably at least 50 parts by mass, and even more preferably at least 70 parts by mass, and is preferably no greater than 95 parts by mass, more preferably no greater than 90 parts by mass, and even more preferably no greater than 85 parts by mass. As a result of the content of the first particulate polymer being within any of the aforementioned ranges, a balance of high levels of both secondary battery rate characteristics and secondary battery cycle characteristics can be achieved.

<Other Components>

The presently disclosed binder composition may contain other components besides the particulate binder (first particulate polymer and second particulate polymer) described above such as a water-soluble polymer, a conductive additive, a reinforcing material, a leveling agent, a viscosity modifier, and an additive for electrolysis solution. These other components are not specifically limited so long as they do not affect the battery reactions and may be selected from commonly known components such as those described in WO 2012/115096 A1. One of such components may be used individually, or two or more of such components may be used in combination in a freely selected ratio.

<Production of Binder Composition>

The presently disclosed binder composition can be produced by dispersing the components described above in an aqueous medium that serves as a dispersion medium. Specifically, the binder composition can be produced by mixing the above-described components and the aqueous medium, such as water, using a mixer. Examples of the mixer include a ball mill, a sand mill, a bead mill, a pigment disperser, a grinding machine, an ultrasonic disperser, a homogenizer, a planetary mixer, and a FILMIX.

Note that in a situation in which the particulate polymers are each produced through polymerization of a monomer composition in an aqueous solvent, the particulate polymers can each be mixed in the form of a produced aqueous dispersion. Moreover, in a situation in which the particulate polymers are each mixed in the form of an aqueous dispersion, water contained in these aqueous dispersions may serve as the aforementioned aqueous medium.

(Slurry Composition for Secondary Battery Electrode)

The presently disclosed slurry composition for a secondary battery electrode is an aqueous slurry composition having an aqueous medium as a dispersion medium and containing an electrode active material and the previously described binder composition. In other words, the presently disclosed slurry composition for a secondary battery electrode contains at least an electrode active material, the previously described first particulate polymer, and a dispersion medium such as water, and may optionally further contain the second particulate polymer and other components. As a result of the presently disclosed slurry composition for a secondary battery electrode containing the previously described binder composition, an electrode including an electrode mixed material layer formed using the slurry composition can cause a secondary battery in which the electrode is used to display excellent rate characteristics and cycle characteristics.

Although the following describes an example in which the slurry composition for a secondary battery electrode is a slurry composition for a lithium ion secondary battery electrode, the presently disclosed slurry composition for a secondary battery electrode is not limited to the following example.

<Electrode Active Material>

The electrode active material is a substance that accepts and donates electrons in an electrode (positive/negative electrode) of a lithium ion secondary battery. In the case of a lithium ion secondary battery, the electrode active material (positive/negative electrode active material) is normally a material that can occlude and release lithium.

[Positive Electrode Active Material]

Specific examples of the positive electrode active material include transition metal-containing compounds, such as a transition metal oxide, a transition metal sulfide, and a composite metal oxide comprising lithium and a transition metal. Examples of the transition metal include Ti, V, Cr, Mn, Fe, Co, Ni, Cu, and Mo.

Examples of the transition metal oxide include MnO, $MnO_2$, $V_2O_5$, $V_6O_{13}$, $TiO_2$, $Cu_2V_2O_3$, amorphous $V_2O$—$P_2O_5$, amorphous $MoO_3$, amorphous $V_2O_5$, and amorphous $V_6O_{13}$.

Examples of the transition metal sulfide include $TiS_2$, $TiS_3$, amorphous $MoS_2$, and FeS.

Examples of the composite metal oxide comprising lithium and a transition metal include a lithium-containing composite metal oxide with a layered structure, a lithium-containing composite metal oxide with a spinel structure, and a lithium-containing composite metal oxide with an olivine structure.

Examples of the lithium-containing composite metal oxide with a layered structure include lithium-containing cobalt oxide ($LiCoO_2$), lithium-containing nickel oxide ($LiNiO_2$), lithium-containing composite oxide of Co—Ni—Mn (Li(Co Mn Ni)$O_2$), lithium-containing composite oxide of Ni—Mn—Al, lithium-containing composite oxide of Ni—Co—Al, and a solid solution comprising $LiMaO_2$ and $Li_2MbO_3$. Examples of the lithium-containing composite oxide of Co—Ni—Mn include $Li[Ni_{0.5}Co_{0.2}Mn_{0.3}]O_2$ and $Li[Ni_{1/3}Co_{1/3}Mn_{1/3}]O_2$. Examples of the solid solution comprising $LiMaO_2$ and $Li_2MbO_3$ include $xLiMaO_2 \cdot (1-x)Li_2MbO_3$ and the like, where x represents a number satisfying $0<x<1$, Ma represents one or more types of transition metals with an average oxidation state of 3+, and Mb represents one or more types of transition metals with an average oxidation state of 4+. Examples of solid solutions such as described above include $Li[Ni_{0.17}Li_{0.2}Co_{0.07}Mn_{0.56}]O_2$.

The term "average oxidation state" as used herein refers to an average oxidation state of the "one or more types of transition metals" and is calculated from the molar quantities and the valences of the transition metals. For example, in a situation in which the "one or more types of transition metals" is made up of 50 mol % of $Ni^{2+}$ and 50 mol % of $Mn^{4+}$, the average oxidation state of the "one or more types of transition metals" is $(0.5) \times (2+) + (0.5) \times (4+) = 3+$.

Examples of the lithium-containing composite metal oxide with a spinel structure include lithium manganate ($LiMn_2O_4$) and compounds obtained by substituting part of Mn contained in lithium manganate ($LiMn_2O_4$) with another transition metal. One specific example thereof is $Li_s[Mn_{2-t}Mc_t]O_4$, such as $LiNi_{0.5}Mn_{1.5}O_4$, where Mc represents one or more types of transition metals having an average oxidation state of 4+, specific examples of which include Ni, Co, Fe, Cu, and Cr; t represents a number satisfying $0<t<1$; and s represents a number satisfying $0 \leq s \leq 1$. Another example of the positive electrode active material is lithium-rich spinel compounds represented by $Li_{1+x}Mn_{2-x}O_4$ ($0<x<2$).

Examples of the lithium-containing composite metal oxide with an olivine structure include olivine-type lithium phosphate compounds represented by the formula $Li_yMdPO_4$, such as olivine-type lithium iron phosphate ($LiFePO_4$) and olivine-type manganese lithium phosphate ($LiMnPO_4$), where Md represents one or more types of transition metals having an average oxidation state of 3+, examples of which include Mn, Fe, and Co, and y represents a number satisfying $0 \leq y \leq 2$. Md of the olivine-type lithium phosphate compounds represented by the formula $Li_yMdPO_4$ may be partly substituted with another metal. Examples of the metal possibly substituting the part of Md include Cu, Mg, Zn, V, Ca, Sr, Ba, Ti, Al, Si, B, and Mo.

[Negative Electrode Active Material]

Examples of the negative electrode active material include a carbon-based negative electrode active material, a metal-based negative electrode active material, and a negative electrode active material formed by combining these materials.

The carbon-based negative electrode active material can be defined as an active material that contains carbon as its main framework and into which lithium can be inserted (also referred to as "doping"). Examples of the carbon-based negative electrode active material include carbonaceous materials and graphitic materials.

A carbonaceous material is a material with a low degree of graphitization (i.e., low crystallinity) that can be obtained by carbonizing a carbon precursor by heat treatment at 2000° C. or lower. The lower limit of the heat treatment temperature in the carbonization is not specifically limited and may for example be 500° C. or higher.

Examples of the carbonaceous material include graphitizing carbon whose carbon structure can easily be changed according to the heat treatment temperature and non-graphitizing carbon typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include sintered phenolic resin, polyacrylonitrile-based carbon fiber, quasi-isotropic carbon, sintered furfuryl alcohol resin (PFA), and hard carbon.

The graphitic material is a material having high crystallinity of a similar level to graphite. The graphitic material can be obtained by heat-treating graphitizing carbon at 2000° C. or higher. The upper limit of the heat treatment temperature is not specifically limited and may for example be 5000° C. or lower.

Examples of the graphitic material include natural graphite and artificial graphite.

Examples of the artificial graphite include an artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

The metal-based negative electrode active material is an active material that contains metal, the structure of which usually contains an element that allows insertion of lithium, and that exhibits a theoretical electric capacity per unit mass of 500 mAh/g when lithium is inserted. Examples of the metal-based active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferred. The capacity of a lithium ion secondary battery can be increased though use of a silicon-based negative electrode active material.

Examples of the silicon-based negative electrode active material include silicon (Si), a silicon-containing alloy, SiO, $SiO_x$, and a composite of conductive carbon and a Si-containing material obtained by coating or combining the Si-containing material with the conductive carbon. One type of silicon-based negative electrode active material may be used individually, or two or more types of silicon-based negative electrode active materials may be used in combination.

The silicon-containing alloy may be, for example, an alloy composition that contains silicon, aluminum, and transition metals such as iron, and further contains rare-earth elements such as tin and yttrium.

$SiO_x$ is a compound that contains Si and at least one of SiO and $SiO_2$, where x is usually at least 0.01 and less than 2. $SiO_x$ can for example be formed by utilizing a disproportionation reaction of silicon monoxide (SiO). Specifically, SiO can be prepared by heat-treating SiO, optionally in the presence of a polymer such as polyvinyl alcohol, to produce silicon and silicon dioxide. After SiO has optionally been pulverized and mixed with the polymer, the heat treatment can be performed at a temperature of 900° C. or higher, and preferably 1000° C. or higher, in an atmosphere containing organic gas and/or vapor.

The composite of a Si-containing material and conductive carbon may be, for example, a compound obtained, for example, by heat-treating a pulverized mixture of SiO, a polymer such as polyvinyl alcohol, and optionally a carbon material in an atmosphere containing organic gas and/or vapor. Furthermore, a commonly known method can be used to obtain the composite, such as a method of coating the surfaces of particles of SiO with organic gas or the like by chemical vapor deposition, or a method of forming composite particles (granulation) by a mechanochemical process using SiO particles and graphite or artificial graphite.

<Binder Composition>

The binder composition contained in the slurry composition for a lithium ion secondary battery electrode can be the presently disclosed binder composition for a secondary battery electrode containing water, the first particulate polymer, and optionally the second particulate polymer.

The blending amount of the binder composition is not specifically limited. However, the total amount of the first particulate polymer and the second particulate polymer, in terms of solid content, may for example be at least 0.5 parts by mass and no greater than 3.0 parts by mass per 100 parts by mass of the electrode active material.

<Other Components>

Examples of other components that may be contained in the slurry composition include, but are not specifically limited to, the same other components that may be contained in the presently disclosed binder composition. One of such other components may be used individually, or two or more of such other components may be used in combination in a freely selected ratio.

<Production of Slurry Composition>

The slurry composition described above can be produced by dispersing the above-described components in an aqueous medium that serves as a dispersion medium. Specifically, the slurry composition can be produced by mixing the above-described components and the aqueous medium using a mixer such as a ball mill, a sand mill, a bead mill, a pigment disperser, a grinding machine, an ultrasonic disperser, a homogenizer, a planetary mixer, or a FILMIX. Mixing of the above-described components and the aqueous medium may normally be performed for a period of from 10 minutes to several hours in a temperature range of from room temperature to 80° C.

Although water is normally used as the aqueous medium, alternatively, an aqueous solution of a freely selected compound or a mixed solution of a small amount of an organic medium and water may be used. Note that water used as the aqueous medium may include water that was contained in the binder composition.

(Electrode for Secondary Battery)

The above-described slurry composition for a secondary battery electrode (slurry composition for a negative/positive electrode) produced using the presently disclosed binder composition for a secondary battery electrode can be used in order to produce an electrode (negative/positive electrode) for a secondary battery.

Herein, the electrode for a secondary battery includes a current collector and an electrode mixed material layer that is formed on the current collector. The electrode mixed material layer contains at least an electrode active material and the previously described first particulate polymer. It should be noted that components contained in the electrode mixed material layer are components that are contained in the previously described slurry composition for a secondary battery electrode. Furthermore, the preferred ratio of these components in the electrode mixed material layer is the same as the preferred ratio of these components in the slurry composition.

As a result of the electrode for a secondary battery being produced using the presently disclosed binder composition for a secondary battery electrode, the electrode for a secondary battery can cause a secondary battery to display excellent rate characteristics and cycle characteristics.

<Production Method of Electrode for Secondary Battery>

The presently disclosed electrode for a secondary battery can be produced, for example, through a step of applying the previously described slurry composition for a secondary battery electrode onto the current collector (application step) and a step of drying the slurry composition for a secondary battery electrode that has been applied onto the current collector to form an electrode mixed material layer on the current collector (drying step). In other words, the electrode mixed material layer of the presently disclosed electrode for a secondary battery is a dried product of the presently disclosed slurry composition for a secondary battery electrode. Note that in a situation in which the first particulate polymer and/or the second particulate polymer described above includes a polymer that includes a monomer unit derived from a crosslinkable monomer (i.e., a crosslinkable monomer unit), the polymer including the crosslinkable monomer unit may be crosslinked in the drying of the slurry composition for a secondary battery electrode or in optional heat treatment performed after the drying (in other words, the electrode mixed material layer of the presently disclosed electrode for a secondary battery may contain a crosslinked product of the first particulate polymer and/or the second particulate polymer described above).

[Application Step]

The previously described slurry composition for a secondary battery electrode can be applied onto the current collector by any commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may be made of, for example, iron, copper, aluminum, nickel, stainless steel, titanium, tantalum, gold, or platinum. Of these materials, copper foil is particularly preferable as a current collector for a negative electrode. On the other hand, aluminum foil is particularly preferable as a current collector for a positive electrode. One of such materials may be used individually, or two or more of such materials may be used in combination in a freely selected ratio.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition for an electrode on the current collector as described above, an electrode mixed material layer is formed on the current collector, thereby providing an electrode for a secondary battery that includes the current collector and the electrode mixed material layer.

After the drying step, the electrode mixed material layer may be further subjected to pressing treatment (pressing process), such as mold pressing or roll pressing. The pressing process can improve close adherence between the electrode mixed material layer and the current collector. Moreover, a higher density electrode mixed material layer and a more compact secondary battery can be obtained as a result.

Furthermore, when the electrode mixed material layer contains a curable polymer, the polymer is preferably cured after the electrode mixed material layer has been formed.

In a situation in which the electrode mixed material layer is subjected to a pressing process for densification of the electrode mixed material layer, the pressing process is preferably carried out such that the porosity of the electrode mixed material layer is preferably at least 10.7%, more preferably at least 15.2%, and even more preferably at least 17.4%. Moreover, the pressing process is preferably carried out such that the porosity of the electrode mixed material layer is preferably no greater than 24.1%, more preferably no greater than 22.8%, and even more preferably no greater than 21.9%. Through use of the presently disclosed binder composition for a secondary battery electrode, a secondary battery electrode can be caused to display excellent rate characteristics and cycle characteristics compared to when other binder compositions are used, particularly in a situation in which the density of the electrode mixed material layer is increased to the extent that the electrode mixed material layer has a porosity of no greater than 24.1%.

However, it should be noted that even when the presently disclosed binder composition for a secondary battery electrode is used, lowering of rate characteristics and cycle characteristics may occur if the porosity of the electrode mixed material layer is less than 10.7%.

In a situation in which the electrode mixed material layer is, for example, a negative electrode mixed material layer, the bulk density of the negative electrode mixed material layer is preferably at least 1.70 $g/cm^3$, more preferably at least 1.73 $g/cm^3$, and even more preferably at least 1.75 $g/cm^3$, and is preferably no greater than 2.00 $g/cm^3$, more preferably no greater than 1.90 $g/cm^3$, and even more preferably no greater than 1.85 $g/cm^3$. Through use of the presently disclosed binder composition for a secondary battery electrode, a secondary battery can be caused to display excellent rate characteristics and cycle characteristics compared to when other binder compositions are used, even in a situation in which the density of the negative electrode mixed material layer is increased to the extent that the bulk density of the negative electrode mixed material layer is at least 1.70 $g/cm^3$. However, it should be noted that even when the presently disclosed binder composition for a secondary battery electrode is used, lowering of rate characteristics and cycle characteristics may occur if the density of the negative electrode mixed material layer is increased to the extent that the bulk density thereof is greater than 2.00 $g/cm^3$.

(Secondary Battery)

The presently disclosed secondary battery includes a positive electrode, a negative electrode, an electrolysis solution, and a separator. In the presently disclosed secondary battery, either or both of the positive electrode and negative electrode are the presently disclosed electrode for a secondary battery. The presently disclosed secondary battery has excellent rate characteristics and cycle characteristics as a result of including the presently disclosed electrode for a secondary battery.

Although the following describes an example in which the secondary battery is a lithium ion secondary battery, the presently disclosed secondary battery is not limited to the following example.

<Electrodes>

As explained above, the presently disclosed electrode for a secondary battery is used as either or both of the positive electrode and the negative electrode. In other words, the positive electrode of the lithium ion secondary battery may be the presently disclosed electrode and the negative electrode of the lithium ion secondary battery may be a known negative electrode other than the presently disclosed electrode. Alternatively, the negative electrode of the lithium ion secondary battery may be the presently disclosed electrode and the positive electrode of the lithium ion secondary battery may be a known positive electrode other than the presently disclosed electrode. Further alternatively, the positive electrode and the negative electrode of the lithium ion secondary battery may both be the presently disclosed electrode.

<Electrolysis Solution>

The electrolysis solution may be formed by dissolving an electrolyte in a solvent.

The solvent may be an organic solvent that can dissolve an electrolyte. Specifically, the solvent may be an alkyl carbonate solvent to which a viscosity modification solvent is added. Examples of the alkyl carbonate solvent include ethylene carbonate, propylene carbonate, and γ-butyrolactone. Examples of the viscosity modification solvent include 2,5-dimethyltetrahydrofuran, tetrahydrofuran, diethyl carbonate, ethyl methyl carbonate, dimethyl carbonate, methyl acetate, dimethoxyethane, dioxolane, methyl propionate, and methyl formate.

The electrolyte may be a lithium salt. Examples of lithium salts that may be used include those described in JP 2012-204303 A. Of these lithium salts, $LiPF_6$, $LiClO_4$, and $CF_3SO_3Li$ are preferred as electrolytes because they readily dissolve in organic solvents and exhibit a high degree of dissociation.

<Separator>

Examples of the separator include separators described in JP 2012-204303 A. Of these separators, a fine porous membrane made of polyolefinic resin (polyethylene, polypropylene, polybutene, or polyvinyl chloride) is preferred since such a membrane can reduce the total thickness of the separator, which increases the ratio of an electrode active material in the lithium ion secondary battery, and consequently increases the capacity per unit volume.

<Production Method of Lithium Ion Secondary Battery>

The lithium ion secondary battery may be produced, for example, by stacking the positive electrode and the negative electrode with the separator in-between, rolling or folding the resultant stack as necessary in accordance with the battery shape to place the stack in a battery container, filling the battery container with the electrolysis solution, and sealing the battery container. In order to prevent pressure-increase inside the lithium ion secondary battery and occurrence of overcharging or overdischarging, an overcurrent preventing device such as a PTC device or a fuse; an expanded metal; or a lead plate may be provided as necessary. The shape of the lithium ion secondary battery may be, for example, a coin type, button type, sheet type, cylinder type, prismatic type, or flat type.

EXAMPLES

The following provides a more specific description of the present disclosure based on examples. However, the present disclosure is not limited to the following examples. In the following, "%" and "parts" used to express quantities are by mass, unless otherwise specified.

In the examples and comparative examples, evaluations were performed by the following methods in order to evaluate the degree of swelling in electrolysis solution and glass transition temperature of a polymer forming a core portion of a first particulate polymer, of a polymer forming a shell portion of a first particulate polymer, and of a second particulate polymer, the number average particle diameter of a first particulate polymer and of a second particulate polymer, the mass proportion of a shell portion in a first particulate polymer, the peel strength, porosity, and bulk density of an electrode, and the rate characteristics and cycle characteristics of a secondary battery.

<Degree of Swelling in Electrolysis Solution>

For each of a core portion and a shell portion of a first particulate polymer, a monomer composition used to produce the core portion or shell portion was used to prepare an aqueous dispersion of a polymer (polymer of the core portion or polymer of the shell portion) as a measurement sample under then same polymerization conditions as used for forming the core portion or shell portion.

The aqueous dispersions of the polymer of the core portion and the polymer of the shell portion described above and an aqueous dispersion of a second particulate polymer were each used to form a film with a thickness of 3±0.3 mm by drying the aqueous dispersion for three days in an environment of 50% humidity and a temperature of from 23° C. to 25° C. Each resultant film was cut to a diameter of 12 mm and was precisely weighed.

The mass of the film piece obtained by this cutting was taken to be W0. The film piece was immersed in 50 g of an electrolysis solution (composition: $LiPF_6$ solution of 1.0 M in concentration (mixed solvent of 3/7 (weight ratio) ethylene carbonate/ethyl methyl carbonate used as solvent; 2 volume % (solvent ratio) of vinylene carbonate added as additive)) for 72 hours at an ambient temperature of 60° C., and was allowed to swell. Thereafter, the film piece (swollen film piece) was pulled out of the electrolysis solution, was wiped gently, and the mass W1 thereof was measured.

The degree of swelling (mass %) was calculated according to the following formula.

Degree of swelling (mass %)=($W1/W0$)×100

<Glass Transition Temperature>

Measurement samples were prepared by drying aqueous dispersions of the polymer of the core portion, the polymer of the shell portion, and the second particulate polymer. The glass transition temperature of each of the measurement samples was measured using a differential themoanalyzer (produced by SII Technology, product name: EXSTAR DSC6220).

Specifically, 10 mg of the measurement sample was weighed into an aluminum pan and a DSC curve was measured with respect to the measurement sample under normal temperature and humidity with a measurement temperature range of from −100° C. to 500° C. and a heating rate of 10° C./minute, and using an empty aluminum pan as a reference. The glass transition temperature was determined from an intersection point of a base line directly before a heat absorption peak on the DSC curve at which a derivative signal (DDSC) was at least 0.05 mW/minute/mg in a heating process and a tangent to the DSC curve at a first inflection point to appear after the heat absorption peak.

<Number Average Particle Diameter>

The number average particle diameter of a particulate polymer (first/second particulate polymer) was measured using a laser diffraction/scattering particle size distribution analyzer (LS230 produced by Beckman Coulter, Inc.).

Specifically, the laser diffraction/scattering particle size distribution analyzer was used to measure a particle diameter-cumulative number distribution for the particulate polymer with respect to an aqueous dispersion containing the particulate polymer, and the number average particle diameter of the particulate polymer was taken to be a particle diameter at which a value of the cumulative distribution reached 50%.

<Mass Proportion of Shell Portion in First Particulate Polymer>

The mass proportion of the shell portion in the first particulate polymer was calculated by the following formula from the total mass M1 of all monomers contained in a monomer composition for core portion formation and the total mass M2 of all monomers contained in a monomer composition for shell portion formation.

Mass Proportion of Shell Portion (Mass %)={$M2/(M1+M2)$}×100

<Electrode Peel Strength>

A specimen having a rectangular shape of 1.0 cm in width by 10 cm in length was cut out from a produced negative electrode for a lithium ion secondary battery and was fixed such that the surface at a negative electrode mixed material layer side of the specimen was on top. Cellophane tape was then attached to the surface at the negative electrode mixed material layer side of the specimen. Tape prescribed by JIS Z1522 was used as the cellophane tape. The cellophane tape was then peeled off from one end of the specimen at a rate of 50 mm/minute and an angle of 180° (i.e., in a direction toward the other end of the specimen) while measuring the stress during peeling. This measurement was performed 10 times to obtain an average value of the stress. The average value was taken to be the peel strength (N/m) and was evaluated by the following standard. A greater peel strength indicates better binding of the negative electrode mixed material layer to the current collector.

A: Peel strength of at least 8 N/m
B: Peel strength of at least 5 N/m and less than 8 N/m
C: Peel strength of at least 3 N/m and less than 5 N/m
D: Peel strength of less than 3 N/m <Porosity and Bulk Density>

The porosity and bulk density of a negative electrode mixed material layer of a produced negative electrode for a lithium ion secondary battery were calculated based on the following formulae. Note that the true density of the negative electrode mixed material layer was calculated from the density (theoretical value) of solid content contained in a slurry composition used for the negative electrode.

Bulk density (g/cm$^3$)=Mass per unit area of negative electrode mixed material layer/Thickness of negative electrode mixed material layer Porosity (%)={1−(Bulk density of negative electrode mixed material layer/True density of negative electrode mixed material layer)}×100

<Secondary Battery Rate Characteristics>

A produced pouch lithium ion secondary battery was left for 24 hours and was then subjected to an operation in which the lithium ion secondary battery was charged to 4.4 V and discharged to 3.0 V at a charge/discharge rate of 0.2 C. Thereafter, a charge/discharge cycle was carried out at 25° C. in which the lithium ion secondary battery was charged to 4.4 V at a charge rate of 0.2 C and discharged to 3.0 V at a discharge rate of 1.0 C and a charge/discharge cycle was carried out at 25° C. in which the lithium ion secondary battery was charged to 4.4 V at a charge rate of 0.2 C and discharged to 3.0 V at a discharge rate of 3.0 C. The battery capacity at 3.0 C was calculated as a percentage relative to the battery capacity at 1.0 C. The calculated percentage was taken to be a charge/discharge rate characteristic and was evaluated by the following standard. A higher charge/discharge rate characteristic indicates lower internal resistance and capability for high-speed charging and discharging, and thus indicates better rate characteristics.

A: Charge/discharge rate characteristic of at least 70%
B: Charge/discharge rate characteristic of at least 65% and less than 70%
C: Charge/discharge rate characteristic of at least 60% and less than 65%
D: Charge/discharge rate characteristic of less than 60%

<Secondary Battery Cycle Characteristics>

A produced pouch lithium ion secondary battery was left for 24 hours and was then subjected to an operation in which the lithium ion secondary battery was charged to 4.4 V and discharged to 3.0 V at a charge/discharge rate of 0.2 C. The initial capacity C0 in this operation was measured. Charge/discharge cycles in which the lithium ion secondary battery was charged to 4.4 V and discharged to 3.0 V at a charge/discharge rate of 1.0 C were carried out repeatedly at an ambient temperature of 45° C., and the capacity C1 after 300 cycles was measured. High-temperature cycle characteristics were evaluated based on the rate of capacity maintenance indicated by ΔC=(C1/C0)×100(%). A higher rate of capacity maintenance indicates a smaller decrease of discharge capacity, and thus indicates better high-temperature cycle characteristics.

A: Rate of capacity maintenance ΔC of at least 80%
B: Rate of capacity maintenance ΔC of at least 75% and less than 80%
C: Rate of capacity maintenance ΔC of at least 70% and less than 75%
D: Rate of capacity maintenance ΔC of less than 70%

Example 1

<Production of First Particulate Polymer>

A reaction vessel equipped with a stirrer was charged with 76.8 parts (96.0% in core portion) of butyl acrylate as a (meth)acrylic acid ester monomer, 1.6 parts (2.0% in core portion) of methacrylic acid as an ethylenically unsaturated carboxylic acid monomer, 1.6 parts (2.0% in core portion) of acrylonitrile as a vinyl cyanide monomer, 0.3 parts of sodium dodecylbenzenesulfonate as an emulsifier, 0.3 parts of ammonium persulfate as a polymerization initiator, and 300 parts of deionized water. The contents of the reaction vessel were sufficiently stirred and were then heated to 70° C. A reaction was allowed to proceed for 4 hours (core portion formation step). Next, 19.0 parts (95% in shell portion) of styrene as an aromatic vinyl monomer and 1.0 parts (5% in shell portion) of methacrylic acid as an ethylenically unsaturated carboxylic acid monomer were added into the polymerization system within an addition time of 2 minutes. After this addition, the contents of the reaction vessel were heated to 80° C. and a reaction was allowed to proceed for 3 hours (shell portion formation step). An aqueous dispersion containing a polymer obtained as described above was cooled to 30° C. or lower.

It was confirmed that an aqueous dispersion of a first particulate polymer in which a shell portion partially covered the outer surface of a core portion (i.e., in which a plurality of shell portion structures was present on the outer surface of the core portion) had been obtained using a scanning electron microscope (SEM). The number average particle diameter of the first particulate polymer and the degree of swelling in electrolysis solution and glass transition temperature of the polymer of the core portion and of the polymer of the shell portion were measured by the previously described methods. The results are shown in Table 2.

<Production of Second Particulate Polymer>

A 5 MPa pressure vessel equipped with a stirrer was charged with 33.2 parts of 1,3-butadiene as a conjugated diene monomer, 3.8 parts of itaconic acid as an ethylenically unsaturated carboxylic acid monomer, 62.0 parts of styrene as an aromatic vinyl monomer, 1 part of 2-hydroxyethyl acrylate as a hydroxyalkyl group-containing unsaturated monomer, 0.3 parts of t-dodecyl mercaptan as a molecular weight modifier, 0.3 parts of sodium dodecylbenzenesulfonate as an emulsifier, 150 parts of deionized water, and 1.0 parts of potassium persulfate as a polymerization initiator. The contents of the pressure vessel were sufficiently stirred and were then heated to 50° C. to initiate polymerization. Cooling was performed to terminate the reaction at the point at which the polymerization conversion rate reached 96%. The resultant aqueous dispersion containing a polymer was adjusted to pH 8 through addition of 5% sodium hydroxide aqueous solution. Thereafter, unreacted monomers were removed by heated vacuum distillation. Cooling was then performed to 30° C. or lower. As a result, an aqueous dispersion of a second particulate polymer was obtained. The number average particle diameter, degree of swelling in electrolysis solution, and glass transition temperature of the second particulate polymer were measured by the previously described methods. The results are shown in Table 2.

<Production of Slurry Composition for Lithium Ion Secondary Battery Negative Electrode>

A planetary mixer equipped with a disper blade was charged with 98.0 parts of artificial graphite (specific surface area: 3.6 m$^2$/g, volume average particle diameter: 20 μm) as a negative electrode active material and 1 part by solid content equivalents of a 1% aqueous solution of a carboxymethyl cellulose sodium salt (CMC-Na) as a viscosity modifier. The resultant mixture was adjusted to a solid content concentration of 60% using deionized water and was then mixed for 60 minutes at 25° C.

Subsequently, the mixture was adjusted to a solid content concentration of 52% using deionized water and was then further mixed for 15 minutes at 25° C. to yield a mixed liquid.

Next, 1 part by solid content equivalents of a binder composition obtained by mixing the aqueous dispersion of the first particulate polymer and the aqueous dispersion of the second particulate polymer in a ratio shown in Table 2 (first particulate polymer:second particulate polymer (mass ratio)=80:20) was added to the mixed liquid. Deionized water was also added in order to adjust the final solid content concentration to 50% and a further 10 minutes of mixing was carried out. The resultant mixture was subjected to a defoaming process under reduced pressure to yield a slurry composition for a negative electrode.

<Production of Negative Electrode for Lithium Ion Secondary Battery>

A comma coater was used to apply the produced slurry composition for a negative electrode onto copper foil (current collector) of 15 μm in thickness such as to have a mass per unit area of from 13.5 mg/cm$^2$ to 14.5 mg/cm$^2$. The slurry composition for a negative electrode was dried by conveying the copper foil inside a 70° C. oven for 2 minutes at a speed of 0.5 m/minute. Heat treatment was subsequently performed for 2 minutes at 120° C. to obtain a negative electrode web. Next, the obtained negative electrode web was pressed by a roll press such that the bulk density of a negative electrode mixed material layer was 1.82 g/cm$^3$ and the pressed product was used as a negative electrode. After pressing, the negative electrode mixed material layer had a mass per unit area of 14.0 mg/cm$^2$ and a porosity of 18.8%.

The peel strength of the produced negative electrode was evaluated. The results are shown in Table 2.

<Production of Positive Electrode for Lithium Ion Secondary Battery>

A slurry composition for a positive electrode was obtained by adding, into a planetary mixer, 96.0 parts of LiCoO$_2$ as a positive electrode active material, 2.0 parts of acetylene black (HS-100 produced by Denki Kagaku Kogyo Kabushiki Kaisha) as a conductive additive, and 2.0 parts of PVDF (polyvinylidene fluoride, KF-1100 produced by Kureha Corporation) as a binder, further adding N-methylpyrrolidone to adjust the total solid content concentration to 67%, and then carrying out mixing.

A comma coater was used to apply the obtained slurry composition for a positive electrode onto aluminum foil (current collector) of 20 μm in thickness. The slurry composition for a positive electrode was dried by conveying the aluminum foil inside a 60° C. oven for 2 minutes at a speed of 0.5 m/minute. Heat treatment was subsequently performed for 2 minutes at 120° C. to obtain a positive electrode web. Next, the obtained positive electrode web was pressed by a roll press such that the bulk density of a positive electrode mixed material layer was 3.5 g/cm$^3$, and a positive electrode was thereby obtained.

<Production of Lithium Ion Secondary Battery>

A single-layer polypropylene separator (width 65 mm, length 500 mm, thickness 25 μm; produced by a dry method; porosity 55%) was prepared and a 5 cm×5 cm square shape was cut out therefrom. An aluminum packing case was also prepared as a battery case.

A 4 cm×4 cm square shape was cut out from the produced positive electrode and was arranged with a surface at the current collector side thereof in contact with the aluminum packing case. Next, the square separator was arranged on a surface at the positive electrode mixed material layer side of the positive electrode. Furthermore, a 4.2 cm×4.2 cm square shape was cut out from the produced negative electrode and was arranged on the separator such that a surface at the negative electrode mixed material layer side thereof faced toward the separator. Thereafter, the aluminum packing case was filled with a LiPF$_6$ solution of 1.0M in concentration as an electrolysis solution (mixed solvent of 3/7 (weight ratio) ethylene carbonate/ethyl methyl carbonate used as solvent; 2 volume % (solvent ratio) of vinylene carbonate added as additive). The aluminum packing case was then closed by heat sealing at 150° C. to tightly seal an opening of the aluminum packing case, and thereby produce a lithium ion secondary battery.

The rate characteristics and cycle characteristics of the produced lithium ion secondary battery were evaluated. The results are shown in Table 2.

Examples 2-5, 13, and 14

In each example, a first particulate polymer was produced in the same way as in Example 1 with the exception that the monomers shown in Table 1 were used in the amounts shown in Table 1. For each of these first particulate polymers, although the mass proportion of the shell portion differed from that of the first particulate polymer used in Example 1, the actual compositions of the core portion and the shell portion were the same as in Example 1. It was confirmed that the shell portion partially covered the outer surface of the core portion (i.e., that a plurality of shell portion structures was present on the outer surface of the core portion) in each of these first particulate polymers using a scanning electron microscope (SEM). The number average particle diameter of the first particulate polymer and the degree of swelling in electrolysis solution and glass transition temperature of the polymer of the core portion and of the polymer of the shell portion were measured by the previously described methods. The results are shown in Table 2.

In each example, a binder composition, a slurry composition for a negative electrode, a negative electrode, a positive electrode, and a secondary battery were produced in the same way as in Example 1 with the exception that the aforementioned first particulate polymer was used. Moreover, the evaluations were performed in the same way as in Example 1. The results are shown in Table 2.

Examples 6-9, 15, and 16

In each example, a binder composition, a slurry composition for a negative electrode, a negative electrode, a positive electrode, and a secondary battery were produced in the same way as in Example 1 with the exception that the aqueous dispersion of the first particulate polymer and the aqueous dispersion of the second particulate polymer were used in the ratio shown in Table 2. Moreover, the evaluations were performed in the same way as in Example 1. The results are shown in Table 2.

Example 10

A first particulate polymer was produced in the same way as in Example 1 with the exception that the monomers shown in Table 1 were used in the amounts shown in Table 1. It was confirmed that a shell portion partially covered the outer surface of a core portion (i.e., that a plurality of shell portion structures was present on the outer surface of the core portion) in the produced first particulate polymer using a scanning electron microscope (SEM). The number average particle diameter of the first particulate polymer and the degree of swelling in electrolysis solution and glass transition temperature of the polymer of the core portion and of the polymer of the shell portion were measured by the previously described methods. The results are shown in Table 2.

A binder composition, a slurry composition for a negative electrode, a negative electrode, a positive electrode, and a secondary battery were produced in the same way as in Example 1 with the exception that the aforementioned first particulate polymer was used. Moreover, the evaluations were performed in the same way as in Example 1. The results are shown in Table 2.

Example 11

A binder composition, a slurry composition for a negative electrode, a negative electrode, a positive electrode, and a secondary battery were produced in the same way as in Example 1 with the exception that in production of the negative electrode for a lithium ion secondary battery, the negative electrode web was pressed by the roll press such that the bulk density of the negative electrode mixed material layer was 1.65 g/cm$^3$. The negative electrode mixed material layer had a porosity of 26.4%.

Moreover, the evaluations were performed in the same way as in Example 1. The results are shown in Table 2.

Example 12

A first particulate polymer was produced in the same way as in Example 1 with the exception that the addition time of the shell portion monomer composition was changed to 30 minutes. It was confirmed that a shell portion partially covered the outer surface of a core portion (i.e., that a plurality of shell portion structures was present on the outer surface of the core portion) in the produced first particulate polymer using a scanning electron microscope (SEM). The number average particle diameter of the first particulate polymer and the degree of swelling in electrolysis solution and glass transition temperature of the polymer of the core portion and of the polymer of the shell portion were measured by the previously described methods. The results are shown in Table 2.

A binder composition, a slurry composition for a negative electrode, a negative electrode, a positive electrode, and a secondary battery were produced in the same way as in Example 1 with the exception that the aforementioned first particulate polymer was used. Moreover, the evaluations were performed in the same way as in Example 1. The results are shown in Table 2.

Example 17

A binder composition, a slurry composition for a negative electrode, a negative electrode, a positive electrode, and a secondary battery were produced in the same way as in Example 1 with the exception that the second particulate polymer was not used and the amount of the first particulate polymer was set as 1 part. Moreover, the evaluations were performed in the same way as in Example 1. The results are shown in Table 2.

Comparative Example 1

A first particulate polymer was produced in the same way as in Example 1 with the exception that the addition time of the shell portion monomer composition was changed to 180 minutes. It was confirmed that a shell portion completely covered the outer surface of a core portion in the produced first particulate polymer using a scanning electron microscope (SEM). The number average particle diameter of the first particulate polymer and the degree of swelling in electrolysis solution and glass transition temperature of the polymer of the core portion and of the polymer of the shell portion were measured by the previously described methods. The results are shown in Table 2.

A binder composition, a slurry composition for a negative electrode, a negative electrode, a positive electrode, and a secondary battery were produced in the same way as in Example 1 with the exception that the aforementioned first particulate polymer was used. Moreover, the evaluations were performed in the same way as in Example 1. The results are shown in Table 2.

Comparative Example 2

A binder composition, a slurry composition for a negative electrode, a negative electrode, a positive electrode, and a secondary battery were produced in the same way as in Comparative Example 1 with the exception that in production of the negative electrode for a lithium ion secondary battery, the negative electrode web was pressed by the roll press such that the bulk density of the negative electrode mixed material layer was 1.65 g/cm$^3$. The negative electrode mixed material layer had a porosity of 26.4%.

Moreover, the evaluations were performed in the same way as in Example 1. The results are shown in Table 2.

The following abbreviations are used in Tables 1 and 2, shown below.

BA: Butyl acrylate (acrylic acid ester monomer)

MAA: Methacrylic acid (ethylenically unsaturated carboxylic acid monomer)

AN: Acrylonitrile (vinyl cyanide monomer)

BD: 1,3-Butadiene (conjugated diene monomer)

ST: Styrene (aromatic vinyl monomer)

CMC-Na: Carboxymethyl cellulose sodium salt

TABLE 1

| | | | Example 1 | Example 2 | Example 3 | Example 4 | Example 5 | Example 6 | Example 7 |
|---|---|---|---|---|---|---|---|---|---|
| Core portion polymer composition | BA | Parts by mass | 76.8 | 86.4 | 72.0 | 93.12 | 62.4 | 76.8 | 76.8 |
| | | Mass % in core portion | 96.0 | 96.0 | 96.0 | 96.0 | 96.0 | 96.0 | 96.0 |
| | MAA | Parts by mass | 1.6 | 1.8 | 1.5 | 1.94 | 1.3 | 1.6 | 1.6 |
| | | Mass % in core portion | 2.0 | 2.0 | 2.0 | 2.0 | 2.0 | 2.0 | 2.0 |
| | AN | Parts by mass | 1.6 | 1.8 | 1.5 | 1.94 | 1.3 | 1.6 | 1.6 |
| | | Mass % in core portion | 2.0 | 2.0 | 2.0 | 2.0 | 2.0 | 2.0 | 2.0 |
| | BD | Parts by mass | — | — | — | — | — | — | — |
| | | Mass % in core portion | — | — | — | — | — | — | — |
| | Core total | Parts by mass | 80.0 | 90.0 | 75.0 | 97.0 | 65.0 | 80.0 | 80.0 |
| Shell portion polymer composition | ST | Parts by mass | 19.0 | 9.5 | 23.75 | 2.85 | 33.25 | 19.0 | 19.0 |
| | | Mass % in shell portion | 95.0 | 95.0 | 95.0 | 95.0 | 95.0 | 95.0 | 95.0 |
| | MAA | Parts by mass | 1.0 | 0.5 | 1.25 | 0.15 | 1.75 | 1.0 | 1.0 |
| | | Mass % in shell portion | 5.0 | 5.0 | 5.0 | 5.0 | 5.0 | 5.0 | 5.0 |
| | Shell total | Parts by mass | 20.0 | 10.0 | 25.0 | 3.0 | 35.0 | 20.0 | 20.0 |

| | | | Example 8 | Example 9 | Example 10 | Example 11 | Example 12 | Example 13 | Example 14 |
|---|---|---|---|---|---|---|---|---|---|
| Core portion polymer composition | BA | Parts by mass | 76.8 | 76.8 | 16.8 | 76.8 | 76.8 | 94.08 | 57.6 |
| | | Mass % in core portion | 96.0 | 96.0 | 21.0 | 96.0 | 96.0 | 96.0 | 96.0 |
| | MAA | Parts by mass | 1.6 | 1.6 | 1.6 | 1.6 | 1.6 | 1.96 | 1.2 |
| | | Mass % in core portion | 2.0 | 2.0 | 2.0 | 2.0 | 2.0 | 2.0 | 2.0 |
| | AN | Parts by mass | 1.6 | 1.6 | 21.6 | 1.6 | 1.6 | 1.96 | 1.2 |
| | | Mass % in core portion | 2.0 | 2.0 | 27.0 | 2.0 | 2.0 | 2.0 | 2.0 |
| | BD | Parts by mass | — | — | 40.0 | — | — | — | — |
| | | Mass % in core portion | — | — | 50.0 | — | — | — | — |
| | Core total | Parts by mass | 80.0 | 80.0 | 80.0 | 80.0 | 80.0 | 98.0 | 60.0 |
| Shell portion polymer composition | ST | Parts by mass | 19.0 | 19.0 | 19.0 | 19.0 | 19.0 | 1.90 | 38.0 |
| | | Mass % in shell portion | 95.0 | 95.0 | 95.0 | 95.0 | 95.0 | 95.0 | 95.0 |
| | MAA | Parts by mass | 1.0 | 1.0 | 1.0 | 1.0 | 1.0 | 0.10 | 2.0 |
| | | Mass % in shell portion | 5.0 | 5.0 | 5.0 | 5.0 | 5.0 | 5.0 | 5.0 |
| | Shell total | Parts by mass | 20.0 | 20.0 | 20.0 | 20.0 | 20.0 | 2.0 | 40.0 |

| | | | Example 15 | Example 16 | Example 17 | Comparative Example 1 | Comparative Example 2 |
|---|---|---|---|---|---|---|---|
| Core portion polymer composition | BA | Parts by mass | 76.8 | 76.8 | 76.8 | 76.8 | 76.8 |
| | | Mass % in core portion | 96.0 | 96.0 | 96.0 | 96.0 | 96.0 |
| | MAA | Parts by mass | 1.6 | 1.6 | 1.6 | 1.6 | 1.6 |
| | | Mass % in core portion | 2.0 | 2.0 | 2.0 | 2.0 | 2.0 |
| | AN | Parts by mass | 1.6 | 1.6 | 1.6 | 1.6 | 1.6 |
| | | Mass % in core portion | 2.0 | 2.0 | 2.0 | 2.0 | 2.0 |
| | BD | Parts by mass | — | — | — | — | — |
| | | Mass % in core portion | — | — | — | — | — |
| | Core total | Parts by mass | 80.0 | 80.0 | 80.0 | 80.0 | 80.0 |
| Shell portion polymer composition | ST | Parts by mass | 19.0 | 19.0 | 19.0 | 19.0 | 19.0 |
| | | Mass % in shell portion | 95.0 | 95.0 | 95.0 | 95.0 | 95.0 |
| | MAA | Parts by mass | 1.0 | 1.0 | 1.0 | 1.0 | 1.0 |
| | | Mass % in shell portion | 5.0 | 5.0 | 5.0 | 5.0 | 5.0 |
| | Shell total | Parts by mass | 20.0 | 20.0 | 20.0 | 20.0 | 20.0 |

TABLE 2

|  |  |  |  | Example 1 | Example 2 | Example 3 | Example 4 | Example 5 |
|---|---|---|---|---|---|---|---|---|
| Slurry composition | Binder composition | First particulate polymer | Coverage of core portion by shell portion | Partial | Partial | Partial | Partial | Partial |
|  |  |  | Degree of swelling in electrolysis solution [mass %] — Core portion | 650 | 650 | 650 | 650 | 650 |
|  |  |  | Degree of swelling in electrolysis solution [mass %] — Shell portion | 130 | 130 | 130 | 130 | 130 |
|  |  |  | Glass transition temperature [° C.] — Core portion | −38 | −38 | −38 | −38 | −38 |
|  |  |  | Glass transition temperature [° C.] — Shell portion | 100 | 100 | 100 | 100 | 100 |
|  |  |  | Proportion constituted by (meth)acrylic acid ester monomer unit in core portion [mass %] | 96.0 | 96.0 | 96.0 | 96.0 | 96.0 |
|  |  |  | Mass proportion of shell portion [mass %] | 20 | 10 | 25 | 3 | 35 |
|  |  |  | Number average particle diameter [nm] | 350 | 350 | 350 | 350 | 350 |
|  |  |  | Addition time of shell portion monomer composition [mins] | 2 | 2 | 2 | 2 | 2 |
|  |  |  | Amount [parts by mass] | 0.80 | 0.80 | 0.80 | 0.80 | 0.80 |
|  |  | Second particulate polymer | Degree of swelling in electrolysis solution [mass %] | 150 | 150 | 150 | 150 | 150 |
|  |  |  | Glass transition temperature [° C.] | 10 | 10 | 10 | 10 | 10 |
|  |  |  | Proportion constituted by conjugated diene monomer unit [mass %] | 33.2 | 33.2 | 33.2 | 33.2 | 33.2 |
|  |  |  | Proportion constituted by aromatic vinyl monomer unit [mass %] | 62.0 | 62.0 | 62.0 | 62.0 | 62.0 |
|  |  |  | Number average particle diameter [nm] | 145 | 145 | 145 | 145 | 145 |
|  |  |  | Amount [parts by mass] | 0.20 | 0.20 | 0.20 | 0.20 | 0.20 |
|  |  |  | Proportion constituted by first particulate polymer [mass %] | 80 | 80 | 80 | 80 | 80 |
|  |  |  | Particle diameter ratio *1 [—] | 2.4 | 2.4 | 2.4 | 2.4 | 2.4 |
|  | Negative electrode active material (artificial graphite) [parts by mass] |  |  | 98 | 98 | 98 | 98 | 98 |
|  | Viscosity modifier (CMC-Na) [parts by mass] |  |  | 1 | 1 | 1 | 1 | 1 |
| Negative electrode mixed material layer | Porosity [%] |  |  | 18.8 | 18.8 | 18.8 | 18.8 | 18.8 |
|  | Bulk density [g/cm³] |  |  | 1.82 | 1.82 | 1.82 | 1.82 | 1.82 |
|  | Mass per unit area [mg/cm²] |  |  | 14.0 | 14.0 | 14.0 | 14.0 | 14.0 |
|  | Thickness [μm] |  |  | 77 | 77 | 77 | 77 | 77 |
| Evaluation | Peel strength |  |  | A | A | A | A | B |
|  | Battery rate characteristics |  |  | A | A | A | A | B |
|  | Battery cycle characteristics |  |  | A | A | A | B | A |

|  |  |  |  | Example 6 | Example 7 | Example 8 | Example 9 | Example 10 |
|---|---|---|---|---|---|---|---|---|
| Slurry composition | Binder composition | First particulate polymer | Coverage of core portion by shell portion | Partial | Partial | Partial | Partial | Partial |
|  |  |  | Degree of swelling in electrolysis solution [mass %] — Core portion | 650 | 650 | 650 | 650 | 550 |
|  |  |  | Degree of swelling in electrolysis solution [mass %] — Shell portion | 130 | 130 | 130 | 130 | 130 |
|  |  |  | Glass transition temperature [° C.] — Core portion | −38 | −38 | −38 | −38 | −33 |
|  |  |  | Glass transition temperature [° C.] — Shell portion | 100 | 100 | 100 | 100 | 100 |
|  |  |  | Proportion constituted by (meth)acrylic acid ester monomer unit in core portion [mass %] | 96.0 | 96.0 | 96.0 | 96.0 | 21.0 |
|  |  |  | Mass proportion of shell portion [mass %] | 20 | 20 | 20 | 20 | 20 |
|  |  |  | Number average particle diameter [nm] | 350 | 350 | 350 | 350 | 350 |
|  |  |  | Addition time of shell portion monomer composition [mins] | 2 | 2 | 2 | 2 | 2 |
|  |  |  | Amount [parts by mass] | 0.70 | 0.85 | 0.30 | 0.95 | 0.80 |
|  |  | Second particulate polymer | Degree of swelling in electrolysis solution [mass %] | 150 | 150 | 150 | 150 | 150 |
|  |  |  | Glass transition temperature [° C.] | 10 | 10 | 10 | 10 | 10 |
|  |  |  | Proportion constituted by conjugated diene monomer unit [mass %] | 33.2 | 33.2 | 33.2 | 33.2 | 33.2 |
|  |  |  | Proportion constituted by aromatic vinyl monomer unit [mass %] | 62.0 | 62.0 | 62.0 | 62.0 | 62.0 |
|  |  |  | Number average particle diameter [nm] | 145 | 145 | 145 | 145 | 145 |
|  |  |  | Amount [parts by mass] | 0.30 | 0.15 | 0.70 | 0.05 | 0.20 |
|  |  |  | Proportion constituted by first particulate polymer [mass %] | 70 | 85 | 30 | 95 | 80 |
|  |  |  | Particle diameter ratio *1 [—] | 2.4 | 2.4 | 2.4 | 2.4 | 2.4 |
|  | Negative electrode active material (artificial graphite) [parts by mass] |  |  | 98 | 98 | 98 | 98 | 98 |
|  | Viscosity modifier (CMC-Na) [parts by mass] |  |  | 1 | 1 | 1 | 1 | 1 |
| Negative electrode mixed material layer | Porosity [%] |  |  | 18.8 | 18.8 | 18.8 | 18.8 | 18.8 |
|  | Bulk density [g/cm³] |  |  | 1.82 | 1.82 | 1.82 | 1.82 | 1.82 |
|  | Mass per unit area [mg/cm²] |  |  | 14.0 | 14.0 | 14.0 | 14.0 | 14.0 |
|  | Thickness [μm] |  |  | 77 | 77 | 77 | 77 | 77 |
| Evaluation | Peel strength |  |  | A | A | A | A | A |
|  | Battery rate characteristics |  |  | A | A | B | A | B |
|  | Battery cycle characteristics |  |  | A | A | A | B | A |

TABLE 2-continued

|  |  |  |  | Example 11 | Example 12 | Example 13 | Example 14 | Example 15 |
|---|---|---|---|---|---|---|---|---|
| Slurry composition | Binder composition | First particulate polymer | Coverage of core portion by shell portion | Partial | Partial | Partial | Partial | Partial |
|  |  |  | Degree of swelling in electrolysis solution [mass %]  Core portion | 650 | 650 | 650 | 650 | 650 |
|  |  |  | Shell portion | 130 | 130 | 130 | 130 | 130 |
|  |  |  | Glass transition temperature [° C.]  Core portion | −38 | −38 | −38 | −38 | −38 |
|  |  |  | Shell portion | 100 | 100 | 100 | 100 | 100 |
|  |  |  | Proportion constituted by (meth)acrylic acid ester monomer unit in core portion [mass %] | 96.0 | 96.0 | 96.0 | 96.0 | 96.0 |
|  |  |  | Mass proportion of shell portion [mass %] | 20 | 20 | 2 | 40 | 20 |
|  |  |  | Number average particle diameter [nm] | 350 | 350 | 350 | 350 | 350 |
|  |  |  | Addition time of shell portion monomer composition [mins] | 2 | 30 | 2 | 2 | 2 |
|  |  |  | Amount [parts by mass] | 0.80 | 0.80 | 0.80 | 0.80 | 0.25 |
|  |  | Second particulate polymer | Degree of swelling in electrolysis solution [mass %] | 150 | 150 | 150 | 150 | 150 |
|  |  |  | Glass transition temperature [° C.] | 10 | 10 | 10 | 10 | 10 |
|  |  |  | Proportion constituted by conjugated diene monomer unit [mass %] | 33.2 | 33.2 | 33.2 | 33.2 | 33.2 |
|  |  |  | Proportion constituted by aromatic vinyl monomer unit [mass %] | 62.0 | 62.0 | 62.0 | 62.0 | 62.0 |
|  |  |  | Number average particle diameter [nm] | 145 | 145 | 145 | 145 | 145 |
|  |  |  | Amount [parts by mass] | 0.20 | 0.20 | 0.20 | 0.20 | 0.75 |
|  |  |  | Proportion constituted by first particulate polymer [mass %] | 80 | 80 | 80 | 80 | 25 |
|  |  |  | Particle diameter ratio *1 [—] | 2.4 | 2.4 | 2.4 | 2.4 | 2.4 |
|  | Negative electrode active material (artificial graphite) [parts by mass] |  |  | 98 | 98 | 98 | 98 | 98 |
|  | Viscosity modifier (CMC-Na) [parts by mass] |  |  | 1 | 1 | 1 | 1 | 1 |
| Negative electrode mixed material layer | Porosity [%] |  |  | 26.4 | 18.8 | 18.8 | 18.8 | 18.8 |
|  | Bulk density [g/cm³] |  |  | 1.65 | 1.82 | 1.82 | 1.82 | 1.82 |
|  | Mass per unit area [mg/cm²] |  |  | 14.0 | 14.0 | 14.0 | 14.0 | 14.0 |
|  | Thickness [μm] |  |  | 85 | 77 | 77 | 77 | 77 |
| Evaluation | Peel strength |  |  | A | A | A | C | A |
|  | Battery rate characteristics |  |  | A | B | A | C | C |
|  | Battery cycle characteristics |  |  | A | A | C | A | A |

|  |  |  |  | Example 16 | Example 17 | Comparative Example 1 | Comparative Example 2 |
|---|---|---|---|---|---|---|---|
| Slurry composition | Binder composition | First particulate polymer | Coverage of core portion by shell portion | Partial | Partial | Complete | Complete |
|  |  |  | Degree of swelling in electrolysis solution [mass %]  Core portion | 650 | 650 | 650 | 650 |
|  |  |  | Shell portion | 130 | 130 | 130 | 130 |
|  |  |  | Glass transition temperature [° C.]  Core portion | −38 | −38 | −38 | −38 |
|  |  |  | Shell portion | 100 | 100 | 100 | 100 |
|  |  |  | Proportion constituted by (meth)acrylic acid ester monomer unit in core portion [mass %] | 96.0 | 96.0 | 96.0 | 96.0 |
|  |  |  | Mass proportion of shell portion [mass %] | 20 | 20 | 20 | 20 |
|  |  |  | Number average particle diameter [nm] | 350 | 350 | 350 | 350 |
|  |  |  | Addition time of shell portion monomer composition [mins] | 2 | 2 | 180 | 180 |
|  |  |  | Amount [parts by mass] | 0.97 | 1.00 | 0.80 | 0.80 |
|  |  | Second particulate polymer | Degree of swelling in electrolysis solution [mass %] | 150 | — | 150 | 150 |
|  |  |  | Glass transition temperature [° C.] | 10 | — | 10 | 10 |
|  |  |  | Proportion constituted by conjugated diene monomer unit [mass %] | 33.2 | — | 33.2 | 33.2 |
|  |  |  | Proportion constituted by aromatic vinyl monomer unit [mass %] | 62.0 | — | 62.0 | 62.0 |
|  |  |  | Number average particle diameter [nm] | 145 | — | 145 | 145 |
|  |  |  | Amount [parts by mass] | 0.03 | — | 0.20 | 0.20 |
|  |  |  | Proportion constituted by first particulate polymer [mass %] | 97 | 100 | 80 | 80 |
|  |  |  | Particle diameter ratio *1 [—] | 2.4 | — | 2.4 | 2.4 |
|  | Negative electrode active material (artificial graphite) [parts by mass] |  |  | 98 | 98 | 98 | 98 |
|  | Viscosity modifier (CMC-Na) [parts by mass] |  |  | 1 | 1 | 1 | 1 |
| Negative electrode mixed material layer | Porosity [%] |  |  | 18.8 | 18.8 | 18.8 | 26.4 |
|  | Bulk density [g/cm³] |  |  | 1.82 | 1.82 | 1.82 | 1.65 |
|  | Mass per unit area [mg/cm²] |  |  | 14.0 | 14.0 | 14.0 | 14.0 |
|  | Thickness [μm] |  |  | 77 | 77 | 77 | 85 |
| Evaluation | Peel strength |  |  | A | C | D | A |
|  | Battery rate characteristics |  |  | A | A | D | C |
|  | Battery cycle characteristics |  |  | C | C | D | C |

*1 First particulate polymer/Second particulate polymer

Examples 1-17 in Table 2 demonstrate that an electrode having excellent peel strength and a secondary battery having excellent rate characteristics and cycle characteristics can be obtained when a first particulate polymer is used that has a core-shell structure in which a shell portion partially covers that outer surface of a core portion.

In contrast, Comparative Examples 1 and 2 in Table 2 demonstrate that when a first particulate polymer is used that has a core-shell structure in which a shell portion completely covers a core portion, it is not possible to improve electrode peel strength and secondary battery rate characteristics and cycle characteristics with a good balance, especially in a situation in which the density of an electrode mixed material layer is increased.

Moreover, Examples 1, 2-5, 13, and 14 in Table 2 demonstrate that electrode peel strength and secondary battery rate characteristics and cycle characteristics can be further improved by adjusting the mass proportion of the shell portion in the first particulate polymer.

Furthermore, Examples 1, 6-9, and 15-17 in Table 2 demonstrate that electrode peel strength and secondary battery rate characteristics and cycle characteristics can be further improved by adjusting the ratio of amounts of the first particulate polymer and the second particulate polymer.

Also, Examples 1 and 10 in Table 2 demonstrate that secondary battery rate characteristics can be further improved by changing the composition of the core portion of the first particulate polymer.

Moreover, it can be seen from Table 2 that although similar performance was displayed in Examples 1 and 11, peel strength, rate characteristics, and cycle characteristics were poorer in Comparative Example 1 than Comparative Example 2. This result demonstrates that when a first particulate polymer is used that has a core-shell structure in which a shell portion partially covers the outer surface of a core portion, it is possible to improve electrode peel strength and secondary battery rate characteristics and cycle characteristics with a good balance, especially in a situation in which the density of an electrode mixed material layer is increased.

INDUSTRIAL APPLICABILITY

According to the present disclosure, it is possible to provide a binder composition for a secondary battery electrode that can cause a secondary battery to display excellent rate characteristics and cycle characteristics.

Moreover, according to the present disclosure, it is possible to provide a slurry composition for a secondary battery electrode capable of forming an electrode mixed material layer that can cause a secondary battery to display excellent rate characteristics and cycle characteristics.

Furthermore, according to the present disclosure, it is possible to provide an electrode for a secondary battery that can cause a secondary battery to display excellent rate characteristics and cycle characteristics.

Also, according to the present disclosure, it is possible to provide a secondary battery having excellent rate characteristics and cycle characteristics.

REFERENCE SIGNS LIST

100 first particulate polymer
110 core portion
110S outer surface of core portion
120 shell portion structure

The invention claimed is:

1. A binder composition for a secondary battery electrode comprising a first particulate polymer having a core-shell structure including a core portion and a shell portion that partially covers an outer surface of the core portion, wherein
the shell portion is formed from a polymer having a glass transition temperature of at least 80° C. and no higher than 200° C., and the polymer of the shell portion includes at least 70 mass % of an aromatic vinyl monomer unit.

2. The binder composition for a secondary battery electrode of claim 1, wherein
the core portion is formed from a polymer having a degree of swelling in electrolysis solution of at least 300 mass % and no greater than 900 mass %, and
the polymer of the shell portion has a degree of swelling in electrolysis solution of greater than 100 mass % and no greater than 200 mass %.

3. The binder composition for a secondary battery electrode of claim 1, wherein
the core portion is formed from a polymer having a glass transition temperature of at least −60° C. and no higher than −15° C.

4. The binder composition for a secondary battery electrode of claim 1, wherein
a mass proportion of the shell portion in the first particulate polymer is at least 3 mass % and no greater than 35 mass %.

5. The binder composition for a secondary battery electrode of claim 1, wherein
the core portion is formed from a polymer including at least 50 mass % and no greater than 99.5 mass % of a (meth)acrylic acid ester monomer unit.

6. The binder composition for a secondary battery electrode of claim 1, further comprising
a second particulate polymer, wherein
the second particulate polymer has a degree of swelling in electrolysis solution of greater than 100 mass % and no greater than 200 mass % and a glass transition temperature of at least −10° C. and no higher than 40° C.

7. The binder composition for a secondary battery electrode of claim 6, wherein
in terms of solid content, the first particulate polymer is contained in an amount of at least 30 parts by mass and no greater than 95 parts by mass per 100 parts by mass, in total, of the first particulate polymer and the second particulate polymer.

8. The binder composition for a secondary battery electrode of claim 6, wherein
the second particulate polymer includes at least 5 mass % and no greater than 70 mass % of a conjugated diene monomer unit and at least 10 mass % and no greater than 90 mass % of an aromatic vinyl monomer unit.

9. The binder composition for a secondary battery electrode of claim 6, wherein
a number average particle diameter of the first particulate polymer is equal to a number average particle diameter of the second particulate polymer multiplied by a factor of at least 1 and no greater than 5.

10. A slurry composition for a secondary battery electrode comprising:
the binder composition for a secondary battery electrode of claim 1; and
an electrode active material.

11. An electrode for a secondary battery comprising an electrode mixed material layer obtained using the slurry composition for a secondary battery electrode of claim 10.

12. The electrode for a secondary battery of claim 11, wherein
the electrode mixed material layer has a porosity of at least 10.7% and no greater than 24.1%.

13. A secondary battery comprising
a positive electrode, a negative electrode, a separator, and an electrolysis solution, wherein either or both of the positive electrode and the negative electrode are the electrode for a secondary battery of claim 11.

14. The binder composition for a secondary battery electrode of claim 1, wherein the polymer of the shell portion further includes an ethylenic ally unsaturated carboxylic acid monomer unit.

15. The binder composition for a secondary battery electrode of claim 1, wherein the shell portion is composed by a plurality of shell portion structures.

16. The binder composition for a secondary battery electrode of claim 14, wherein the shell portion is composed by a plurality of shell portion structures.

* * * * *